United States Patent

Toishi et al.

[11] Patent Number: 5,998,591
[45] Date of Patent: Dec. 7, 1999

[54] FIBER-REACTIVE BISAZO COMPOUND

[75] Inventors: Kouji Toishi, Hannan; Nobutaka Kunimi, Toyonaka; Yoshiteru Ohta, Ibaraki, all of Japan

[73] Assignee: Sumitomo Chemical Company, Limited, Osaka, Japan

[21] Appl. No.: 09/081,657

[22] Filed: May 20, 1998

[30] Foreign Application Priority Data

May 22, 1997 [JP] Japan ................... 9-132198

[51] Int. Cl.$^6$ ............... C09B 62/01; C09B 62/513; C09B 62/09; D06P 1/38
[52] U.S. Cl. ............. 534/612; 534/634; 534/637; 534/642
[58] Field of Search .................. 534/634, 637, 534/642, 612

[56] References Cited

U.S. PATENT DOCUMENTS 4,069,218  1/1978  Hegar ..................... 534/634
5,744,589  4/1998  Jager ..................... 534/634

FOREIGN PATENT DOCUMENTS 9-316352  12/1977  Japan.
1576237  10/1980  United Kingdom.

*Primary Examiner*—Fiona T. Powers
*Attorney, Agent, or Firm*—Stevens, Davis, Miller & Mosher, L.L.P.

[57] ABSTRACT

There is provided a bisazo compound which is useful as a reactive dye for dyeing or printing a fiber material in an orange to scarlet or red color; the bisazo compound being represented by the following formula (1):

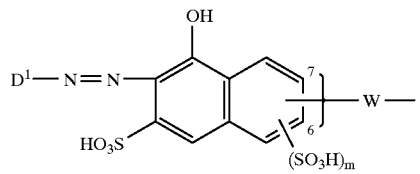

(1)

-continued

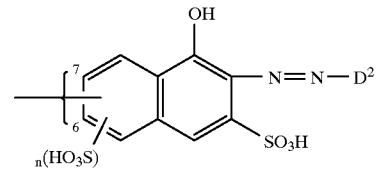

wherein m and n represents 0 or 1; W represents a divalent connecting group represented by —NH— or —NHCONH—;

$D^1$ and $D^2$ represent a group represented by the following formula (2a), (2b), (2c) or (2d)

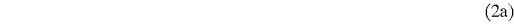

(2a)

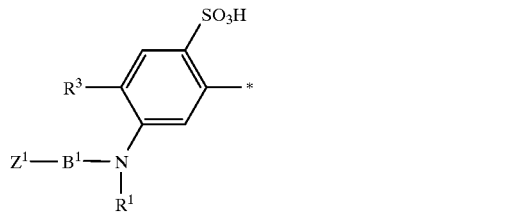

(2b)

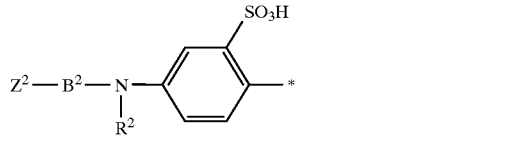

(2c)

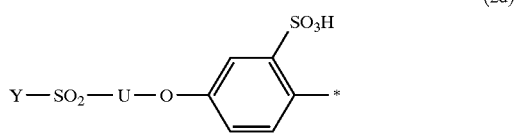

(2d)

wherein Y represents —CH=CH$_2$ or —CH$_2$CH$_2$L, in which L represents a group eliminatable by the action of an alkali.

14 Claims, No Drawings

FIBER-REACTIVE BISAZO COMPOUND

BACKGROUND OF THE INVENTION

The present invention relates to a fiber-reactive bisazo compound and a method for dyeing or printing a fiber material using the compound.

Hitherto, various reactive dyes have been widely used in the field of dyeing and printing of fiber materials. For example, monoazo reactive dyes having a vinylsulfone-type reactive group are known (JP-B-60-36515, etc.).

SUMMARY OF THE INVENTION

The present inventors have intensively studied to develop a dye which is better in reproducibility, building up property, leveling property, washing off property and effective dyeing ratio, than the conventional reactive dyes mentioned above; which can effect dyeing at low salt concentration; and which can provide an orange, scarlet or red dyed product or printed product excellent in various fastness, such as chlorine fastness, light fastness, sweat fastness, sweat sunlight fastness, acid hydrolysis fastness, alkali fastness, washing fastness, peroxide washing fastness and the like. As a result, the present inventors have found that a specific bisazo compound has the intended abilities. Thus, the present invention has been completed.

The present invention provides a bisazo compound represented by the following general formula (1) or a salt thereof:

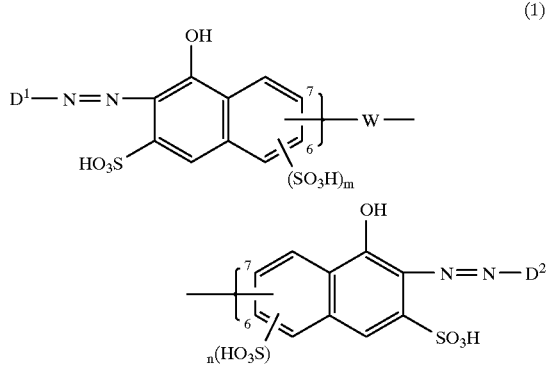

(1)

wherein, m and n, which are the same or different, are 0 or 1;

W represents a divalent connecting group represented by —NH— or —NHCONH—, the connecting group connecting two naphthalene rings and the substitution position being at 6-position or 7-position of each respective naphthalene group;

$D^1$ and $D^2$, which are same or different, represent a group represented by the following formula (2a), (2b), (2c) or (2d), provided that at least one of $D^1$ and $D^2$ being a group represented by the formula (2b), (2c) or (2d):

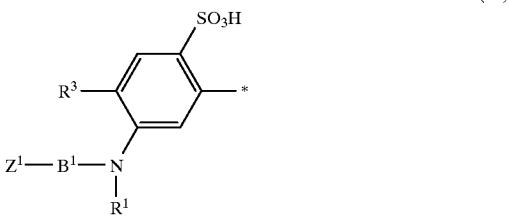

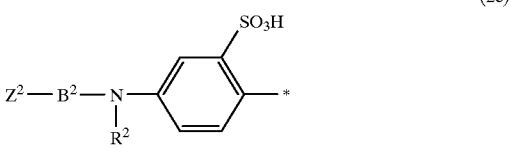

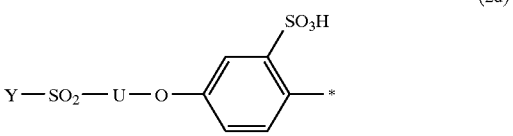

in which,

A represents a phenylene group which may be optionally substituted or a naphthylene group which may be optionally substituted;

$R^1$ and $R^2$, which are same or different, represent hydrogen or a lower alkyl group which may be optionally substituted;

$R^3$ represents hydrogen, methyl or methoxy;

U represents alkylene which may be optionally interrupted by a group of —N($R^0$)—, —NHCO—, —NHCONH— or —O—, in which $R^0$ represents hydrogen or lower alkyl group;

* indicates a bond to the azo group;

$B^1$ and $B^2$, which are same or different, represent a direct bond or a connecting group represented by the following general formula (3)

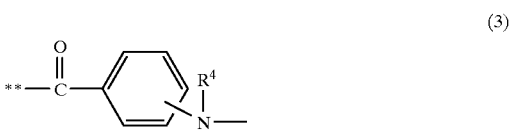

(3)

in which, $R^4$ represents hydrogen or a lower alkyl group which may be optionally substituted, and ** represents a bond to —N($R^1$)— or —N($R^2$)—;

$Z^1$ and $Z^2$, which are same or different and represent an alkylcarbonyl group which may be optionally substituted, phenylcarbonyl group which may be optionally substituted, a group represented by the following general formula (4a) or a group represented by the following general formula (4b);

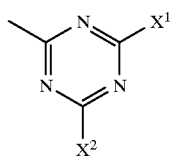 (4a)

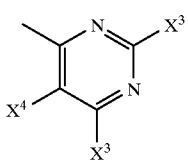 (4b)

in which,
both $X^1$ and $X^2$ represent chloro, or
$X^1$ represents fluoro, chloro, pyridinio or a group represented by the following general formula (5a):

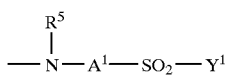 (5a)

while $X^2$ represents a group represented by the following general formula (5b), (5c), (5d) or (5e),

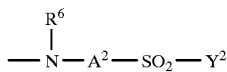 (5b)

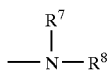 (5c)

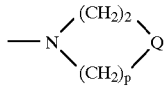 (5d)

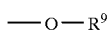 (5e)

in which, $A^1$ and $A^2$, which are same or different, represent alkylene which may be optionally substituted, phenylene which may be optionally substituted or naphthylene which may be optionally substituted, $R^5$, $R^6$, $R^7$, $R^8$ and $R^9$, which are same or different, represent a hydrogen atom, alkyl which may be optionally substituted, cycloalkyl which may be optionally substituted or phenyl which may be optionally substituted, Q represents —$CH_2$—, —O—, —S—, —$SO_2$— or —$NR^{10}$—, wherein $R^{10}$ represents hydrogen or alkyl which may be optionally substituted, $Y^1$ and $Y^2$, which are same or different, represent a group of —CH=$CH_2$ or —$CH_2CH_2L^1$, wherein $L^1$ represents a group eliminatable by the action of an alkali, and p represents 1, 2 or 3, $X^3$ represents fluoro or chloro, and $X^4$ represents chloro, hydrogen, methyl or cyano;

provided that, when $D^1$ and $D^2$ represent a group represented by the above-described formula (2b) or (2c), $Z^1$ and $Z^2$ represent a group represented by the formula (4a) or (4b); and Y represents —CH=$CH_2$ or —$CH_2CH_2L$, in which L represents a group eliminatable by the action of an alkali.

The present invention also provides a method for dyeing or printing a fiber material using a bisazo compound represented by the formula (1) or a salt thereof.

In the general formula (1), $D^1$ and $D^2$ represent a group represented by the above-described formula (2a), (2b), (2c) or (2d), and at least one of $D^1$ and $D^2$ is a group represented by the formula (2b), (2c) or (2d. When both $D^1$ and $D^2$ are groups represented by the formula (2b), (2c) or (2d), $D^1$ and $D^2$ may be the same or different from each other.

In the general formula (1), m and n are 0 or 1 and may be the same or different from each other. Preferably, both and n are 0.

In the general formulae (2b) and (2c), $R^1$ and $R^2$ are same or different and represent a hydrogen atom or lower alkyl group. The lower alkyl group is preferably the one having 1 to 4 carbon atoms. The lower alkyl group may be optionally substituted. Examples of the substituent of the lower alkyl group include alkoxy having 1 to 4 carbon atoms, hydroxy, halogeno such as chloro and bromo, carboxy, carbamoyl, alkoxycarbonyl having 2 to 5 carbon atoms, alkylcarbonyloxy having 2 to 5 carbon atoms, cyano, sulfo and sulfamoyl.

The above-described lower alkyl group, and the alkoxy having 1 to 4 carbon atoms, alkoxycarbonyl having 2 to 5 carbon atoms and alkylcarbonyloxy having 2 to 5 carbon atoms, as the substituent of the lower alkyl group, may be straight chain or branched.

Specific examples of the lower alkyl group which may be optionally substituted represented by $R^1$ or $R^2$ include methyl, ethyl, n-propyl, isopropyl, n-butyl, isobutyl, sec-butyl, 2-hyroxyethyl, 2-hydroxypropyl, 3-hyroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbamoylmethyl, ethoxycarbonylmethyl, 2-methoxycarbamoyethyl, 2-ethoxycarbamoyethyl, 3-methoxycarbamoypropyl, 3-ethoxycarbonylpropyl, 4-methoxycarbonylbutyl, 4-ethoxycarbonylbutyl, methycarbonyloxyethyl, ethylcarbamoyoxymethyl, 2-methycarbonyloxyethyl, 2-ethylcarbonyloxyethyl, 3-methycarbonyloxypropyl, 3-ethycarbonyloxypropyl, 4-metylcarbonyloxybutyl, 4-ethylcarbonyloxybutyl, sulfometnyl, 2-sulfoethyl, 3-sulfopropyl, 4-sulfobutyl, sulfamoylmethyl, 2-sulfaomylethyl, 3-sulfamoylpropyl and 4-sulfamoylbutyl.

As $R^1$ and $R^2$, a hydrogen atom and a lower alkyl group which is not substituted are preferred. Among them, hydrogen, methyl and ethyl are particularly preferred.

In the general formula (2b), $R^3$ represents hydrogen, methyl or methoxy, and preferably methoxy.

In the general formula (2d), U represents alkylene which may be optionally interrupted by a group of —N($R^0$)—, —NHCO—, —NHCONH— or —O—, in which $R^0$ represents hydrogen or lower alkyl group. Specific examples of the alkylene group represented by U include groups represented by the following formulae:

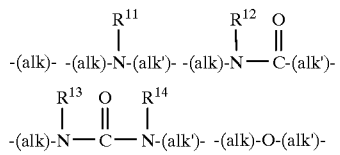

wherein, (alk) and (alk'), which are the same or different, represent alkylene having 2 to 6 carbon atoms, preferably straight-chain alkylene; and $R^{11}$, $R^{12}$, $R^{13}$ and $R^{14}$ represent each independently hydrogen or lower aklyl. The lower alkyl as $R^{11}$, $R^{12}$, $R^{13}$ and $R^{14}$ preferably has 1 to 4 carbon atoms. In the above structural formulae, any of the both ends may bond to —O—.

Among the above examples of U, a group represented by —(alk)— is preferred as U. Particularly, alkylene having 3 to 6 carbon atoms is preferred as U.

In the general formulae (2b) and (2c), $B^1$ and $B^2$ are the same or different and represent a direct bond or a connecting group represented by the general formula (3).

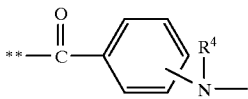 (3)

in which, $R^4$ represents a hydrogen atom or lower alkyl group which may be optionally substituted, and the lower alkyl group preferably has 1 to 4 carbon atoms. Specific examples of the lower alkyl group as $R^4$ which may be optionally substituted include same groups as those exemplified for $R^1$ and $R^2$. $R^4$ is preferably a hydrogen atom or an unsubstituted lower alkyl group, and particularly preferably a hydrogen atom, methyl or ethyl.

In the general formulae (2b) and (2c), $B^1$ and $B^2$ are particularly preferably a direct bond.

In the general formulae (2b) and (2c), $Z^1$ and $Z^2$ are the same or different and represent an alkylcarbonyl group, phenylcarbonyl group, or group represented by the following formula (4a) or (4b),

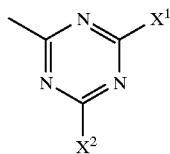 (4a)

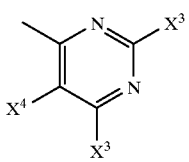 (4b)

provided that, when $D^1$ and $D^2$ represent a group represented by the above-described formula (2b) or (2c), $Z^1$ and $Z^2$ represent a group represented by the above-described formula (4a) or (4b).

The alkylcarbonyl group represented by $Z^1$ and $Z^2$ is preferably a straight or branched group having 2 to 5 carbon atoms, and the alkylcarbonyl group may be substituted or unsubstituted.

Examples of the substituent of the alkylcarbonyl group include alkoxy having 1 to 4 carbon atoms, hydroxy, halogeno such as chloro or bromo, carboxy, carbamoyl, alkoxycarbonyl having 2 to 5 carbon atoms, alkylcarbonyloxy having 2 to 5 carbon atoms, cyano, sulfo and sulfamoyl.

Specific examples of the preferred alkylcarbonyl group represented by $Z^1$ and $Z^2$ include an acetyl group, propionyl group, 2-carboxylethylcarbonyl group and 2-carboxylpropylcarbonyl group.

The phenylcarbonyl group represented by $Z^1$ and $H^2$ may be substituted or unsubstituted.

Examples of the substituent of the phenylcarbonyl group include alkyl having 1 to 4 carbon atoms, alkoxy having 1 to 4 carbon atoms, hydroxy, halogeno, carboxy, carbamoyl, alkoxycarbonyl having 2 to 5 carbon atoms, alkylcarbonyloxy having 2 to 5 carbon atoms, cyano, sulfo and sulfamoyl, and the alkyl or alkoxy having 1 to 4 carbon atoms may be straight or branched.

Specific examples of the preferred phenylcarbonyl group represented by $Z^1$ and $Z^2$ is a benzoyl group, 4-methylbenzoyl group and 4-methoxybenzoyl group.

In the formula (4a), both $X^1$ and $X^2$ represent chloro, or $X^1$ represents fluoro, chloro, pyridinio which may be optionally substituted or a group represented by the following general formula (5a), while $X^2$ represents a group represented by the following general formula (5b), (5c), (5d) or (5e).

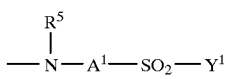 (5a)

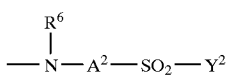 (5b)

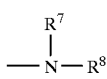 (5c)

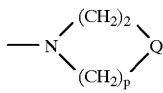 (5d)

—O—$R^9$ (5e)

Examples of the pyridinio represented by $X^1$ include pyridinio, 2-, 3- or 4-carboxypyridinio, 2-, 3- or 4-carbamoylpyridinio, 3-sulfopyridinio, 4-(2-sulfoethyl) pyridinio, 3-(2-hydroxyethyl)pyridinio, 4-chloropyridinio, 3-methylpyridinio and 3,5-dicarboxypyridinio. Among them, 3-carboxypyridinio or 4-carboxypyridinio is particularly preferable.

In the above-described formulae (5a), (5b), (5c) and (5e), $R^5$, $R^6$, $R^7$, $R^8$ and $R^9$ are same or different and represent a hydrogen atom, alkyl which may be optionally substituted, cycloalkyl which may be optionally substituted or phenyl which may be optionally substituted. The alkyl represented by $R^5$, $R^6$, $R^7$, $R^8$ or $R^9$ preferably has 1 to 4 carbon atoms and may be straight or branched.

Examples of the alkyl represented by $R^5$, $R^6$, $R^7$, $R^8$ or $R^9$ include alkyl having 1–4 carbon atoms which may be optionally substituted by 1 or 2 substituents selected from the group consisting of alkoxy having 1 to 4 carbon atoms, sulfo, carboxy, sulfamoyl, carbamoyl, hydroxy, halogeno such as chloro and bromo, cyano, carbonate, sulfonate, phenyl which may be optionally substituted and sulfate.

Examples of the phenyl which may be optionally substituted, which is a substituent of the above-described alkyl, include unsubstituted phenyl and phenyl substitued by 1 or 2 substituents selected from the group consisting of alkyl having 1 to 4 carbon atoms, alkoxy having 1 to 4 carbon atoms, sulfo and halogeno such as chloro or bromo.

Specific examples of the alkyl represented by $R^5$, $R^6$, $R^7$, $R^8$ and $R^9$ include the groups same as those exemplified for $R^1$ and $R^2$, and benzyl which may be optionally substituted.

Among them, methyl, ethyl, n-propyl, isopropyl, n-butyl, isobutyl, sec-butyl, 2-hydroxyethyl, 2-sulfoethyl, 2-methoxyethyl, 2-carboxyethyl, 2-carbamoylethyl, 2-sulfamoylethyle, benzyl, 2-, 3- or 4-sulfobenzyl and the like are preferred.

Examples of the cycloalkyl represented by $R^5$, $R^6$, $R^7$, $R^8$ or $R^9$ include cyclohexyl which may be optionally substituted by, for example, methyl or hydroxyl.

Examples of the phenyl represented by $R^5$, $R^6$, $R^7$, $R^8$ and $R^9$ include phenyl which may be optionally substituted by 1 or 2 substituent selected from the group consisting of straight or branched alkyl having 1 to 4 carbon atoms, straight or branched alkoxy having 1 to 4 carbon atoms, sulfo, carboxyl, halogeno, hydroxy, cyano, carbamoyl, sulfamoyl, carbonate, 2-hydroxyethylsulfonyl, amino, acylamino, and alkylamino having 1 to 4 carbon atoms.

Preferred examples of the phenyl represented by $R^5$, $R^6$, $R^7$, $R^8$ and $R^9$ include unsubstituted phenyl, 2-, 3- or 4-methylphenyl, 2-, 3- or 4-methoxyphenyl, 2-, 3- or 4-ethylphenyl, 2-, 3- or 4-ethoxyphenyl, 2-, 3- or 4-isopropylphenyl, 2-, 3- or 4-carboxyphenyl, 2-, 3- or 4-carbamoylphenyl, 2-, 3- or 4-chlorophenyl, 2-, 3- or 4-sulfophenyl, 2-, 3- or 4-hydroxyphenyl, 2-sulfo-4-methoxyphenyl, 2-sulfo-4-acetylaminophenyl, 2-carboxy-4-acetylaminophenyl, 2-methoxy-5-methylphenyl, 2,4-dimethoxyphenyl and 2,5-dimethoxyphenyl.

More preferred examples of $R^5$ and $R^6$ include a hydrogen atom, methyl, ethyl and phenyl, and among them, hydrogen atom is particularly preferred.

It is more preferable that one of $R^7$ and $R^8$ is a hydrogen atom or alkyl which may be optionally substituted, and the other is phenyl which may be optionally substituted.

It is particularly preferable that $R^7$is a hydrogen atom, methyl or ethyl, and $R^8$ is phenyl which may be optionally substituted by a substituent selected from the group consisting of alkyl having 1 to 4 carbon atoms, alkoxy having 1 to 4carbon atoms, sulfo, carboxy, halogeno, hydroxy, cyano and acylamino.

When $X^2$ in the general formula (4a) is a group represented by the general formula (5c), examples of the amine compound represented by $HNR^7R^8$ used for forming this group include:

ammonia;

aromatic amines such as 1-aminobenzene, 1-amino-2-, -3- or -4-methylbenzene, 1-amino-2,4-, -3,4- or -3,5-dimethylbenzene, 1-amino-2-, -3- or -4-ethylbenzene, 1-amino-2-, -3- or -4-methoxybenzene, 1-amino-2-, -3- or -4-ethoxybenzene, 1-amino-2-, -3- or -4-proplbenzene, 1-amino-2-, -3- or -4-isopropylbenzene, 1-amino-2-, -3- or -4-chlorobenzene, 1-amino-2-, -3- or-4-bromobenzene, 1-amino-2-, -3- or-4-fluorobenzene, 1-amino-2,4- or -2,5-dimethoxybenzene, 1-amino-2-methoxy-5-methylbenzene, 3- or 4-aminophenylmethanesulfonic acid, 2-, 3- or 4-aminobenzenesulfonic acid, 3- or 4-methylaminobenzenesulfonic acid, 3- or 4-ethylaminobenzenesulfonic acid, 5-aminobenzene-1,3-disulfonic acid, 6-aminobenzene-1,3- or -1,4-disulfonic acid, 4-aminobenzene-1,2-disulfonic acid, 4-amino-5-methylbenzene-1,2-disulfonic acid, 1-amino-2-sulfo-4-methoxybenzene, 1-amino-2-sulfo-4-acetylaminobenzene, 2-, 3- or 4-aminobenzoic acid, 2-, 3- or 4-carbamoylaniline, 1-amino-2-carboxy-4-acetylaminobenzene, 5-aminobenzene-1,3-dicarboxylic acid, 5-amino-2-hydroxybenzenesulfonic acid, 4-amino-2-hydroxybenzenesulfonic acid, 5-amino-2-ethoxybenzenesulfonic acid, N-methylaminobenzene, N-ethylaminobenzene, 1-methylamino-3- or-4-methylbenzene, 1-ethylamino-3- or -4-methylbenzene, 1-methylamino-2-, -3- or -4-chlorobenzene, 1-ethylamino-2-, -3- or -4-chlorobenzene, 1-(2-hydroxyethyl)amino-3-methylbenzene, 3- or 4-methylaminobenzoic acid, 1-amino-2-methoxy-5-methylbenzene, 1-amino-2,5-dimethoxybenzene, 2-, 3- or 4-aminophenol, 1-amino-3- or -4-acetylaminobenzene, 2,4- or 2,5-diaminobenzenesulfonic acid, and 1-aminobenzene-3- or -4-(β-hydroxyethylsulfone);

aliphatic amines such as methylamine, ethylamine, n-propylamine, isopropylamine, n-butylamine, isobutylamine, sec-butylamine, dimethylamine, diethylamine, methylethylamine, allylamine, 2-cloroethylamine, 2-methoxyethylamine, 2-aminoethanol, 2-methylaminoethanol, bis(2-hydoxyethyl)amine, 2-aceytlaminoethylamine, 1-amino-2-propanol, 3-methoxypropylamine, 1-amino-3-dimethylaminopropane, 2-aminoethanesulfonamide, 2-aminoethanesulfonic acid, aminomethanesulfonic acid, 2-methylaminoethanesulfonamide, 2-methylaminoethanesulfonic acid, 3-amino-1-propanesulfonic acid, 2-sulfate ethylamine, aminoacetic acid, methylaminoacetic acid, 3-aminopropionic acid, 3-aminopropionamide, 3-methylaminopropionamide, ε-aminocapronic acid, benzylamine, 2-, 3- or 4-sulfobenzylamine, 2-, 3- or 4-chlorobenzylamine, 2-, 3- or 4-methylbenzylamine, N-methybenzylamine, 1-phenylethylamine, 2-phenylethylamine, and 1-phenyl-2-propylamine.

Preferred examples of the above amine compound include aniline, N-methylaniline, N-ethylaniline, 2-, 3- or 4-chloroaniline, N-methyl-2-, -3- or -4-chloroaniline, N-ethyl-2-, -3- or-4-chloroaniline, 2-, 3- or 4-methylaniline, 2-, 3- or 4-ethylaniline, 2-, 3- or 4-methoxyaniline, 2-, 3- or 4-ethoxyaniline, 2-, 3- or 4-propylaniline, 2-, 3- or 4-isopropylaniline, 2-, 3- or 4-hydroxyaniline, aniline-2-, -3- or-4-sulfonic acid, 3- or 4-methylaminobenzenesulfonic acid, 3- or 4-ethylaminobenzenesulfonic acid, 2- 3- or 4-carboxyaniline, 2-, 3-or 4-carbamoylaniline, 2,4-or 2,5-dimethoxyaniline, 2-sulfo-4-methoxyaniline, 2-sulfo-4-acetylaminoaniline, 2-carboxy-4-acetylaminoaniline, 2-methoxy-5-methylaniline, ammonia, methylamine, ethylamine, dimethylamnine, taurine, N-methyltaurine, mono- or diethanolamine, 2-sulfamoylethylamine, and 2-carbamoylethylamine.

Among them, aniline, N-methylaniline, N-ethylaniline, N-ethyl-2-, -3- or -4-chloroaniline, 2-, 3- or 4-ethylaniline, 2-, 3- or 4-methoxyaniline, 2-, 3- or 4-propylaniline, 2-, 3- or 4-isopropylaniline, 2-, 3- or 4-hydroxyaniline, aniline-2-, -3- or -4-sulfonic acid, 2-, 3- or 4-carboxyaniline, 2-, 3- or 4-carbamoylaniline, 2,4- or 2,5-dimethoxyaniline, 2-sulfo-4-methoxyaniline, 2-sulfo-4-acetylaminoaniline, 2-carboxy-4-acetylaminoaniline, 2-methoxy-5-methyaniline are particularly preferred.

$R^9$ is more preferably hydrogen or alkyl having 1 to 4 carbon atoms, and among them, methyl or ethyl is particularly preferable.

When $X^2$ in the general formula (4a) is a group represented by the general formula (5e), examples of the compound represented by $HOR^9$ used for forming this group include:

phenols such as phenol, 1-hydroxy-2-, -3- or -4-methylbenzene, 1-hydroxy-3,4- or -3,5-diemthylbenzene, 1-hydroxy-2-, -3- or -4-ethylbenzene, 1-hydroxy-2-, -3- or -4-methoxybenzene, 1-hydroxy-2-, -3- or -4-ethoxybenzene, 1-hydroxy-2-, -3- or -4-chlorobenzene, 3- or 4-hydroxyphenylmethanesulfonic acid, 3- or 4-hydroxybenzenesulfonic acid, 5-hydroxybenzene-1,3-disulfonic acid, 2-hydroxybenzene-1,4-disulfonic acid, 4-hydroxybenzene-1,2-disulfonic acid, 4-hydroxy-5-methylbenzene-1,2-disulfonic acid, 3- or 4-hydroxybenzoic acid, 5-hydroxybenzene-1,3-dicarboxylic acid, and 5-hydroxy-2-ethoxybenzenesulfonic acid;

aliphatic alcohols such as methanol, ethanol, n-propanol, isopropanol, n-butanol, isobutanol, sec-butanol, 2-chloroethanol, 2-methoxyethanol, 2-ethoxyethanol, 3-methoxypropanol, 3-ethoxypropanol, 2-hydroxyethaneuslfonic acid, 3-hydroxyethoxypropanol, 3-hydroxy-1-propanesulfonic acid, 2-cyanoethanol, 2-sulfateethanol, glycolic acid, 3-hydroxypropionic acid, benzyl alcohol, 2-, 3- or 4-chlorobenzyl alcohol, 4-methylbenzyl alcohol, 2-, 3- or 4-sulfobenzyl alcohol, 2-phenylethanol and 1-phenyl-2-propanol.

In the general formula (5d), Q represents —$CH_2$—, —O—, —S—, —$SO_2$— or —$NR_{10}$—, wherein $R^{10}$ represents hydrogen or alkyl which may be optionally substituted, and p is 1, 2 or 3. The alkyl represented by $R^{10}$ preferably has 1 to 4 carbon atoms. Examples of the substituent of this alkyl include halogeno such as chloro and bromo and alkoxy having 1 to 4 carbon atoms. Examples of $R^{10}$ include hydrogen and straight or branched $C_1$ to $C_4$ unsubstituted alkyl, and particularly preferably, hydrogen, methyl and ethyl.

Specific examples of the group represented by formula (5d) include residual groups derived from pyrrolidine, piperidine, piperazine, n-alkylpiperazine and morpholine. Among them, groups in which p is 2 and Q is —O— or —$CH_2$—, namely, morpholino or piperidino is particularly preferable.

In the above-described formulae (5a) and (5b), $A^1$ and $A^2$ are same or different and represent alkylene which may be optionally substituted, phenylene which may be optionally substituted or naphthylene which may be optionally substituted. The alkylene may be straight or branched.

Examples of the above-described alkylene represented by $A^1$ or $A^2$ include $C_2$ to $C_4$ alkylenes which may be optionally substituted by a substituent selected from the group consisting of $C_1$ to $C_4$ alkyl, halogeno, hydroxy, sulfo, cyano, $C_1$ to $C_4$ alkoxy, $C_1$ to $C_4$ alkoxycarbonyl, $C_1$ to $C_4$ alkylcarbonyl and carbamoyl. Among them, unsubstituted $C_2$ to $C_4$ alkylene is preferred, and ethylene or trimethylene is particularly preferred.

Examples of the phenylene represented by A, $A^1$ and $A^2$ include phenylene which may be optionally substituted by 1 or 2 substituents selected from the group consisting of straight or branched $C_1$ to $C_4$ alkyl, straight or branched $C_1$ to $C_4$ alkoxy, sulfo and halogeno such as chloro and bromo. Among them, phenylene which may be optionally substituted by 1 or 2 substituents selected from the group consisting of methyl, ethyl, methoxy, ethoxy, chloro, bromo and sulfo is more preferred, and phenylene which may be substituted by 1 or 2 substituents selected from methyl and methoxy is particularly preferred. Specific examples of the phenylene include:

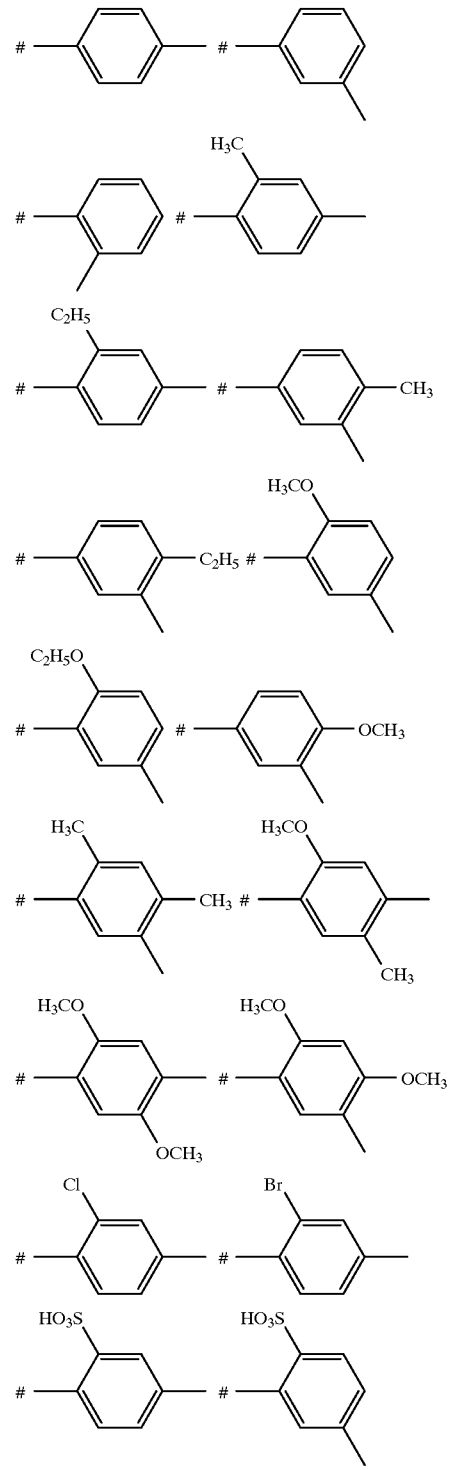

wherein, mark # indicates a bond connecting to —$NR^5$— or —$NR^6$— in which $R^5$ and $R^6$ are the same as defined above.

Examples the naphthylene which may be substituted represented by A, $A^1$ and $A^2$ include naphthylene which may be optionally substituted by 1 or 2 sulfos. Specific examples of such naphthylene include:

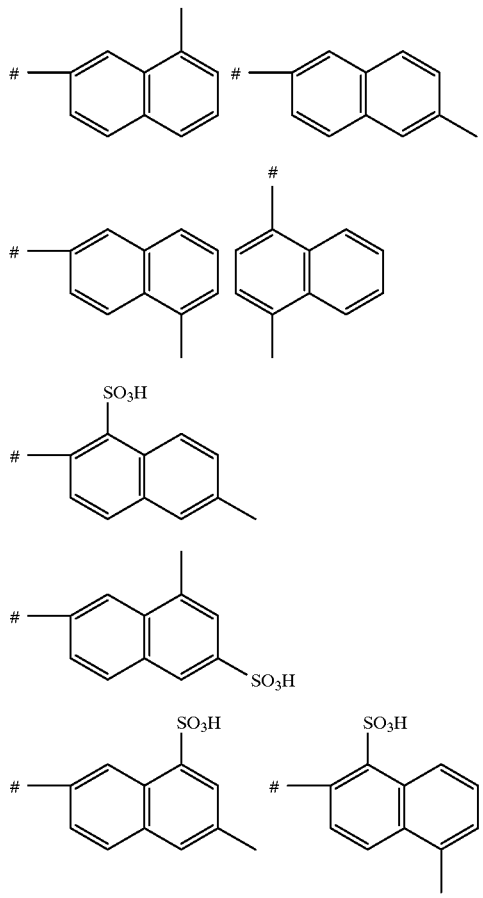

wherein, mark # indicates a bond connecting to —NR$^5$— or —NR$^6$— in which R$^5$ and R$^6$ are the same as defined above.

Particularly preferable examples of the group represented by the general formula (4a) include:

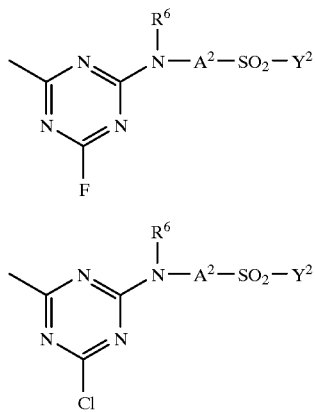

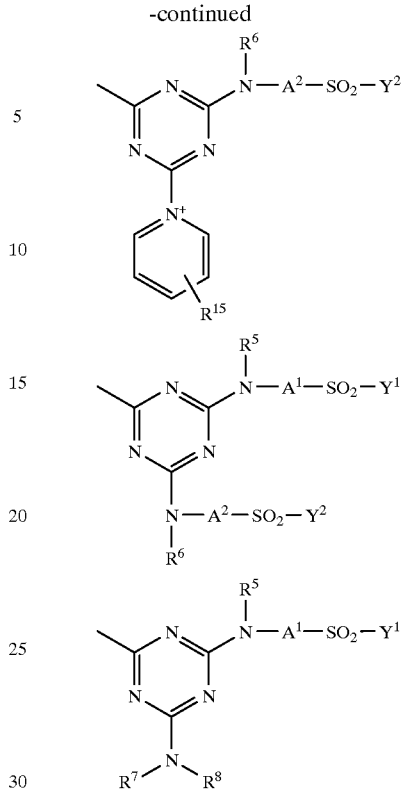

wherein, A$^1$, A$^2$, R$^5$, R$^6$, R$^7$, R$^8$, Y$^1$ and Y$^2$ are the same as defined above, and R$^{15}$ represents a carboxyl group or carbamoyl group.

X$^3$ in the general formula (4b) represents fluoro or chloro, X$^4$ in the general formula (4b) represents chloro, hydrogen, methyl or cyano. Examples of the group represented by the formula (4b) include groups represented by the following formulae.

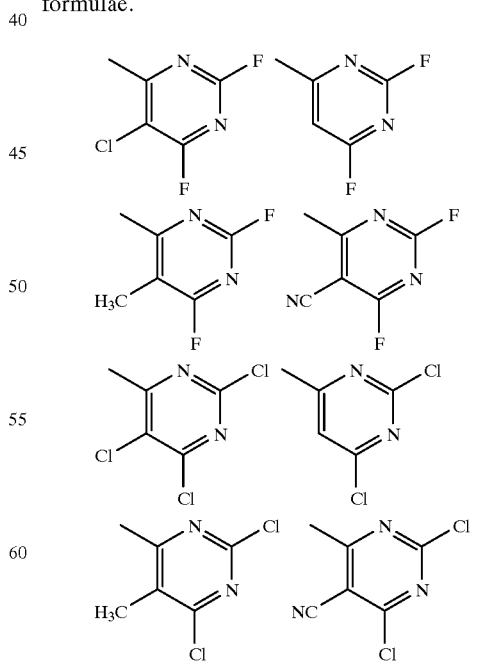

Among them, difluoromonochloropyrimidinyl group, the first formula, or the like is particularly preferred.

In the formulae (2a), (2d), (5a) and (5b), Y, $Y^1$ and $Y^2$ are same or different and represent —CH=CH$_2$, —CH$_2$CH$_2$L or —CH$_2$CH$_2$L$^1$, wherein L and L$^1$ represents a group eliminatable by the action of an alkali.

Y, $Y^1$ and $Y^2$ preferably represent —CH=CH$_2$, —CH$_2$CH$_2$Cl, —CH$_2$CH$_2$OSO$_3$H and the like. Among them, —CH=CH$_2$ and —CH$_2$CH$_2$OSO$_3$H are more preferable, and —CH$_2$CH$_2$OSO$_3$H is particularly preferable.

The bisazo compound (1) of the present invention may be in the form of a free acid, a salt thereof or a mixture thereof. Preferably, the bisazo compound (1) is in the form of an alkaline metal salt, an alkaline earth metal salt or a mixture containing them. Among them, a sodium salt, potassium salt, lithium salt and a mixture containing them are particularly preferred.

Preferred examples of the bisazo compound of the present invention include compounds described below.

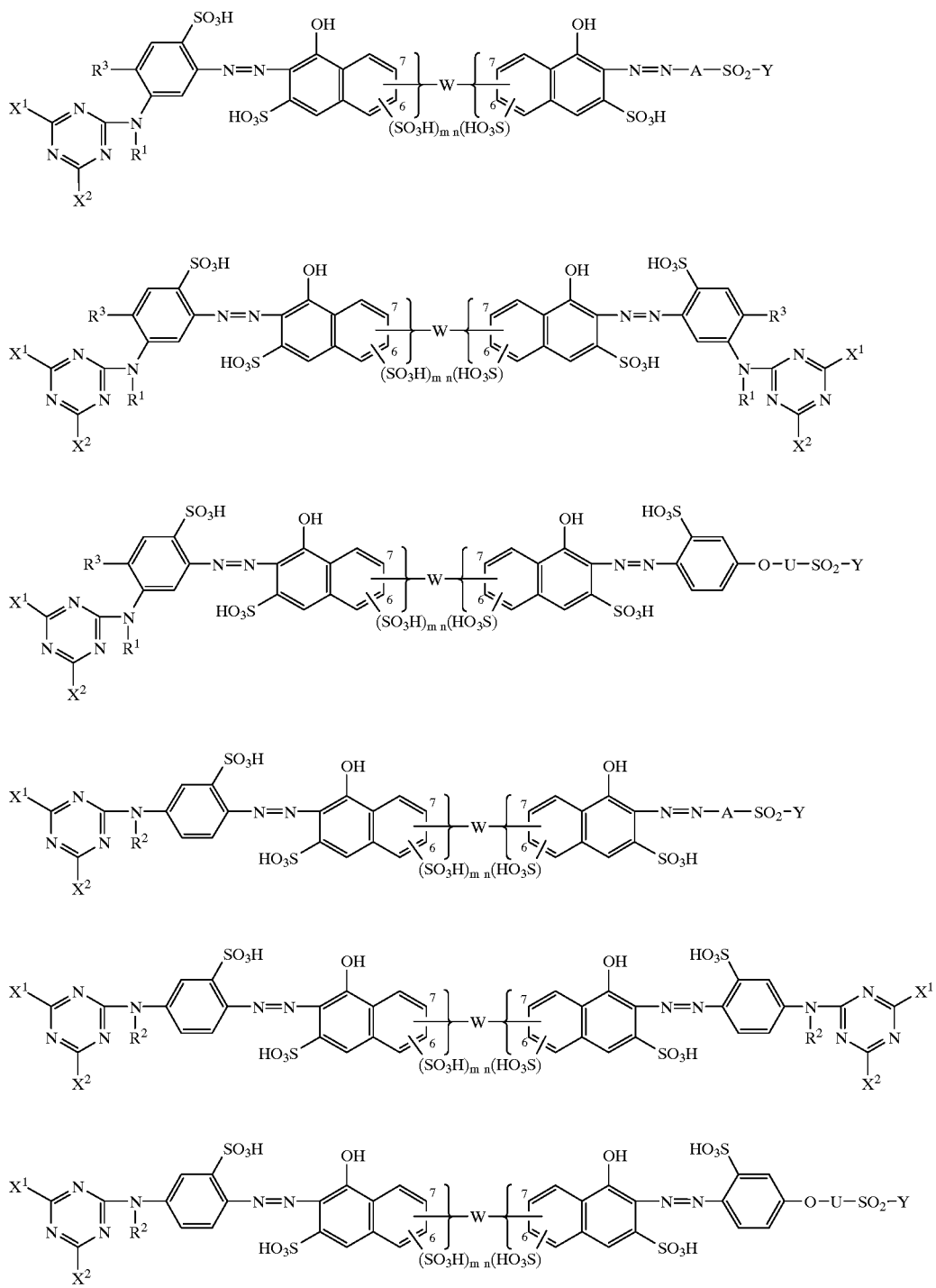

-continued

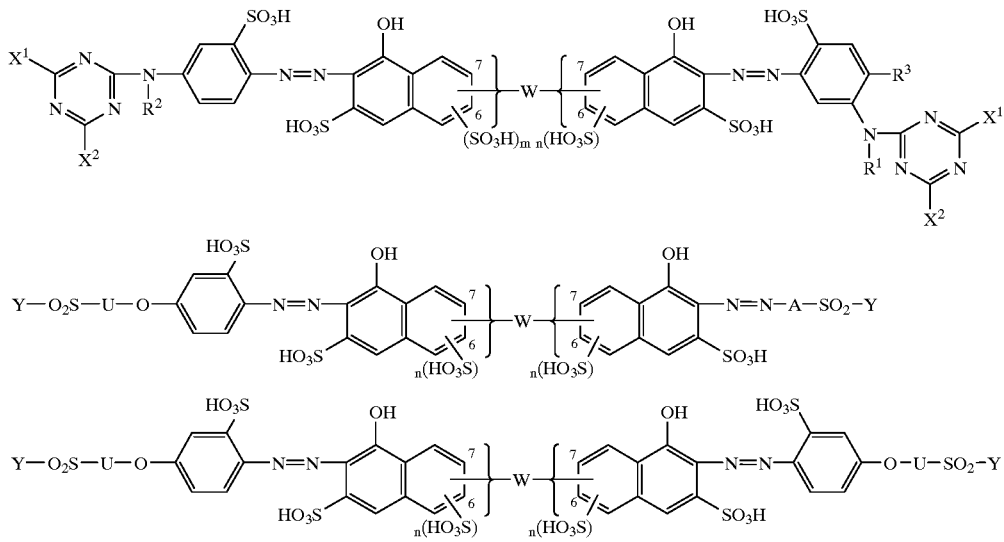

wherein, $R^1$, $R^2$, $R^3$, A, $X^1$, $X^2$, U, Y, W, m and n are the same as defined above.

Among those exemplified above, bisazo compounds in which $R^1$ and $R^2$ are the same or different and represent hydrogen, methyl or ethyl, $R^3$ represents hydrogen or methyl, A represents phenylene which may be optionally substituted, $X^1$ represents fluoro, chloro or pyridinio which may be optionally substituted, and $X^2$ represents a group represented by the formula (5b), or bisazo compounds in which $X^1$ represents a group represented by the general formula (5a), $X^2$ represents a group represented by the general formula (5b) or (5c) and U represents alkylene having 3 to 6 carbon atoms are particularly preferred.

The bisazo compound of the present invention can be produced, for example, by the methods (I) and (II) described bellow from a compound represented by the following formulae 6(a), 6(b), 6(c) or 6(d):

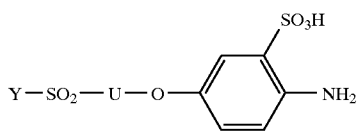
(6a)

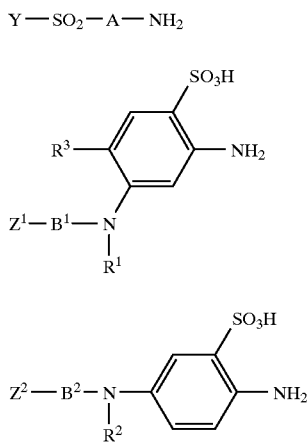

(6b)

(6c)

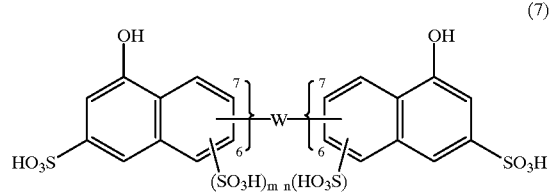
(6d)

wherein, A, $R^1$, $R^2$, $R^3$, $B^1$, $B^2$, $Z^1$, $Z^2$, U and Y are the same as defined above, or a salt thereof.

Method (I):

A compound represented by the formula (6b), (6c) or (6d), or a salt thereof, is diazotized according to a conventional method. The diazotized compound thus obtained is effected a coupling reaction with a compound represented by the following general formula (7):

(7)

[Structure of formula (7): naphthalene-based compound with OH, HO3S, SO3H groups and W linker]

wherein, W, m and n are the same as defined above, or a salt thereof, according to a conventional method, to produce a bisazo compound(1) of the present invention.

In this procedure, the compound of formula (6b), (6c) or (6d), or a salt thereof, are used in an amount 2-times in equivalents based on that of the compound (7), or a salt thereof.

For example, a compound represented by the formula (7) wherein W is —NHCONH—, m is 0 and n is 0 (Compound i) can be produced by reacting phosgene with a corresponding aminonaphthol derivative. A compound represented by the formula (7) wherein W is —NH—, m is 0 and n is 0 (Compound ii) can be produced by reacting sodium sulfite with a corresponding aminonaphthol derivative. Further, a compound represented by the formula (7) wherein W is —NHCONH— or —NH—, and m is 1and/or n is 1 can be produced by sulfonating the compound i or compound ii, according to a conventional method.

The divalent connecting group represented by W is connected to 6-position or 7-position of the naphthalene rings. Preferably, W is connected to both 6-positions of the naphthalene rings or connected to both 7-positions of the naphthalene rings.

Preferred examples of the compound represented by the formula (7) include the following compounds.

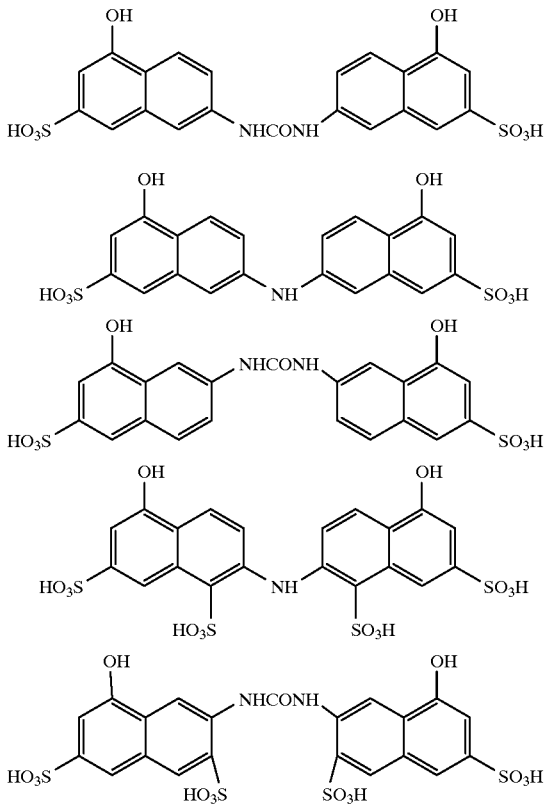

Among them, compounds represented by the following formulae are particularly preferred.

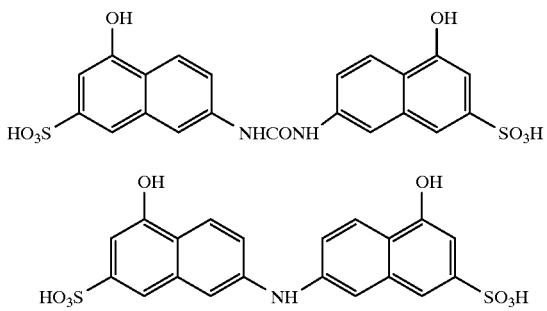

Method (II):

A compound represented by the formula (6a), (6b), (6c) or (6d), or a salt thereof, is diazotized according to a conventional method. The diazotized compound thus obtained is effected a coupling reaction with a compound represented by the formula (7), according to a conventional method, followed by salting out to produce the corresponding monoazo compound. The obtained monoazo compound is effected a coupling reaction with a diazo compound which was obtained by diazotizing a compound of formula (6b), (6c) or (6d), or a salt thereof, to produce a bisazo compound of the present invention.

The compounds represented by the formulae (6b) and (6c), or a salt thereof, can also be produced according to a known method. For example, it can be produced by condensing according to a conventional method a compound represented by the following formula (8a) or (8b)

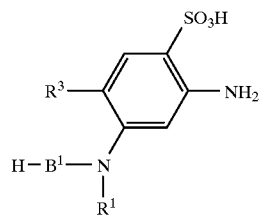

(8a)

(8b)

wherein, $R^1$, $R^2$, $R^3$, $B^1$ and $B^2$ are the same as defined above, or a salt thereof, with a compound represented by the following formula (10a) or (10b):

$$Z^1-X_o \quad (10a)$$

$$Z^2-X_o \quad (10b)$$

wherein, $Z^1$ and $Z^2$ are the same as defined above, and $X_0$ represents halogeno such as fluoro and chloro.

Further, the compound of formula (6b), or a salt thereof, a raw material, can be produced, for example, by condensing, according to a conventional method, a compound represented by the following formula (11):

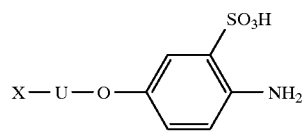

(11)

wherein, U is the same as defined above, and X represents halogeno such as fluoro and chloro, or a salt thereof, with mercaptoethanol, then conducting oxidation to obtain a precursor of a compound represented by the formula (6d), followed by effecting an esterification or a halogenotization depending on the kind of the group L eliminatable by the action of an alkali. The above-described condensation reaction, oxidation reaction, esterification reaction and halogenotization reaction can be effected according to respective known methods.

The bisazo compound of the present invention is fiber-reactive, and suitable for dyeing and printing organic materials containing a hydroxyl group and/or amide group, particularly, cellulose fiber, natural or synthetic polyamide fiber, polyurethane fiber, leather, or a mix spun material containing at least one of them.

The hydroxyl group-containing material may be, for example, a natural or synthetic hydroxyl group-containing material, such as a cellulose fiber material or its regenerated product, polyvinylalcohol and the like. The cellulose fiber material are preferably cotton or other vegetable fiber, such as linen, hemp, jute and ramie fiber. The regenerated cellulose fiber material is, for example, viscose staple or filament viscose.

The carbonamide group-containing material may be, for example, synthetic or natural polyamide, polyurethane, or leather. In particular, fibrous materials, such as wool, other animal hair, silk, polyamide-6,6, polyamide-6, polyamide-11 and polyamide-4 are exemplified.

The compound of the present invention can be used for dyeing or printing the above-descried material, particularly the above-described fiber material by a method according to the physicochemical conditions.

For example, exhaustion dyeing is conducted onto a cellulose fiber material at relatively low temperature in the presence of an acid-bonding agent such as sodium carbonate, tertiary sodium phosphate or sodium hydroxide, optionally mirabilite or sodium chloride being added, and if desired, using a dissolving aid, penetrant or level dyeing agent together. A neutral salt which promotes exhaustion of a dye can be added after the intended dyeing temperature is accomplished, or before it, and, in some cases, may be added in portions.

When a cellulose fiber material is dyed according to a padding method, the padding is conducted at room temperature or elevated temperature. After drying, fixing can be effected by steaming or dry heating.

Printing on a cellulose fiber material can be carried out by applying a printing paste, such as those containing sodium hydrogen carbonate and other acid bonding agent, on the fiber material, then by conducting steaming at 95 to 160° C. (one-phase), or by applying a neutral or weak acidic printing paste on the fiber material, and passing this through a hot alkaline bath containing an electrolyte, or conducting over-padding with a padding solution containing an alkaline electrolyte, then effecting steaming or dry heating treatment. (two-phase)

For the printing paste, a pasting agent or an emulsifying agent such as sodium alginate and starch ether is used. Optionally, a usual printing auxiliary such as urea and/or a dispersing agent may be used together.

An acid bonding agent suitable for fixing the bisazo compound (1) of the present invention on cellulose fiber can be, for example, a hydroxide of alkaline metal, a water-soluble basic salt of alkaline metal or alkaline earth metal with an inorganic or organic acid, or a compound which eliminates an alkali in heated condition. In particular, a hydroxide of alkaline metal and an alkaline metal salt of an inorganic or organic acid of weak or medium strength are listed. Among them, a hydroxide of sodium or potassium, a sodium salt and potassium salt are preferred. Specific examples of such acid bonding agents include sodium hydroxide, potassium hydroxide, sodium hydrogen carbonate, sodium carbonate, sodium formate, potassium carbonate, sodium primary, secondary or tertiary phosphate, sodium silicate and sodium trichloroacetate.

Dyeing of synthetic or natural polyamide and polyurethane fiber can be conducted by firstly exhausting a dye onto fiber from an acidic or weak acidic dye bath under controling pH, followed by changing pH value to neutral or alkaline range for fixing. Dyeing can be usually conducted at a temperature from 60 to 120° C. To attain satisfactory levelness, there can also be used a usual leveling agent, such as a condensation product of cyanuric chloride with aminobenzenesulfonic acid or aminonaphthakenesulfonic acid in an amount of 3-times by mol, or an adduct of stearylamine with ethylene oxide.

The bisazo compound (1) of the present invention imparts itself orange to scarlet or red color tone on a fiber material. To obtain desired color other than orange to scarlet, the compound (1) may be mixed with other dye in an amount which does not impair features of the present invention. A dye to be mixed and used is not particularly restricted provided that it is a reactive dye. Examples thereof include dyes containing at least one group from sulfatoethylsulfonic group, vinylsulfonic group, monochlorotriazine group, monofluorotriazine group, triazine mononicotinate group, dicyclotriazine group, difluoropyrimidine group and trichloropyrimidine group; dyes commercially available under the trademark of Sumifix, Sumifix Supra, Remazol, Levafix, Procion, Cibacon, Basilen, Drimarene, Kaya cion, Kayacelon and the like, further, dyes described in JP-A-50-178, 51-17,538, 56-9,483, 56-15,481, 56-118,976, 56-128,380, 57-2,365, 57-89,679, 57-143,360, 58-191,755, 59-15,451, 59-96,174, 59-161,463, 60-6,754, 60-123,559, 60-229,957, 60-260,654, 61-126,175, 61-155,469, 61-225,256, 63-77,974, 63-225,664, 1-185,370, 3-770, 5-247,366 and 6-287,463, and dye represented by C. I. Reactive Blue 19 and C. I. Reactive Black 5.

The bisazo compound (1) of the present invention manifests excellent ability in dyeing and printing on a fiber material, particularly on a cellulose fiber material. A dyed material and a printed material obtained by using this compound have excellent light fastness, perspiration and light fastness, wet fastness such as washing fastness, peroxide washing fastness, chlorine fastness, perspiration fastness, acid hydrolysis fastness and alkali fastness, and further excellent abrasion fastness and iron fastness.

The bisazo compound (1) of the present invention is characterized by excellent dyeing ability, build-up property, level dyeing property and washing off property, and by excellent solubility, exhaustion and fixing property. Particularly, it is characterized by excellent dyeing and fixing property in deep color, and further, excellent low salt dyeing property. The bisazo compound (1) is also characterized in that it is not easily affected by variations in the dyeing temperature, the amounts of dyeing aids such as a salt and alkaline agent and bath ratio, and provides a dyed material having stable quality.

It is also characteristic feature of the present compound that the resulting dyed material is little suffered from discoloration in fixing treatment and resin finishing, and does not reveal much change in color by contact with a basic substance during storage.

EXAMPLE

The following examples further illustrate the present invention in detail, but should not be interpreted to limit the scope thereof. In the examples, all parts are by weight.

Example 1

In an aqueous medium, 58.1 parts of a compound of which free acid is represented by the formula (12)

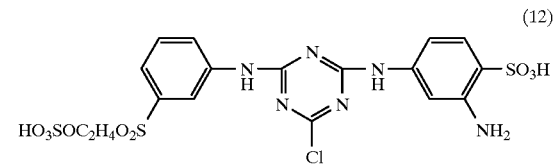

(12)

is diazotized by an ordinary method using sodium nitrite to obtain a diazo compound. Then, this diazo compound is coupled with 25.2 parts of a compound of which free acid is represented by the formula (13)

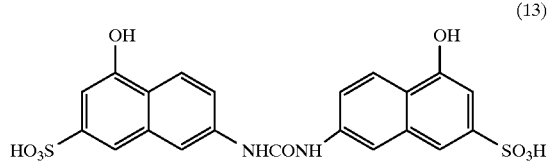

to obtain a bisazo compound of which free acid is represented by the following formula.

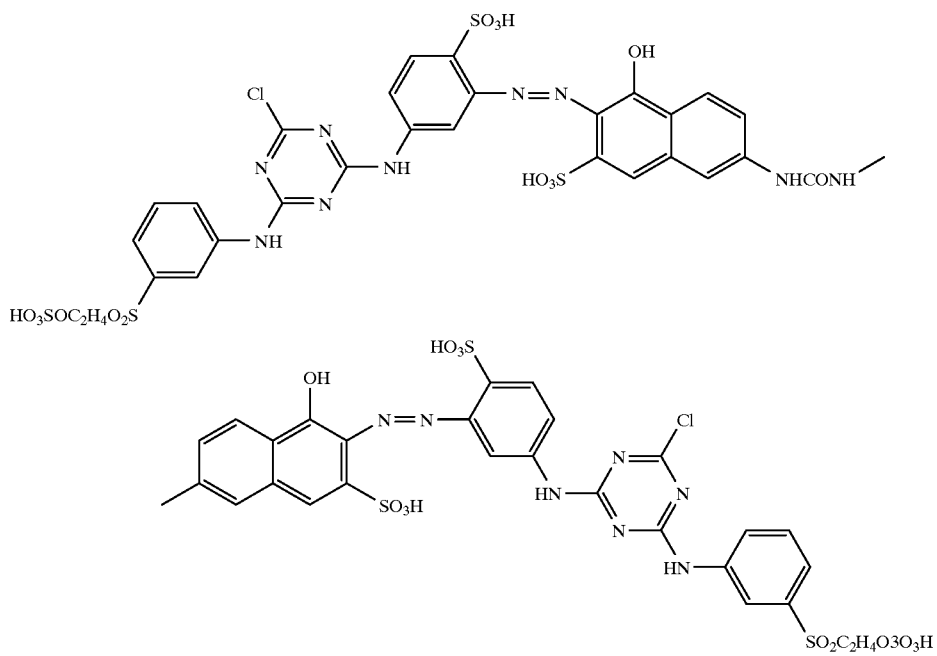

($\lambda$ max=504 nm, in an aqueous solvent)

Example 2

The same synthesis procedure as that in Examples 1 is repeated, except that the compound (12) and the compound (13) are replaced with a compound listed in column B and a compound listed in column C, respectively, in the following Tables 1 to 4 to obtain corresponding bisazo compounds of the present invention.

It is expected that color tone shown in column D in the Tables 1 to 4 is revealed on cotton.

TABLE 1

| A | B | D |
|---|---|---|
| 1 | (structure with chloro-triazine, CH$_2$=CHO$_2$S-phenyl-HN, and aminophenyl-SO$_3$H) | Red |
| 2 | (structure with HOSO$_3$C$_2$H$_4$SO$_2$C$_2$H$_4$NH-triazine, HO$_3$S-phenyl-HN, and SO$_3$H/NH-phenyl) | Orange |

TABLE 1-continued
| | | |
|---|---|---|
| 3 | 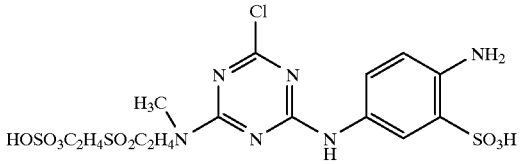 | Red |
| 4 | 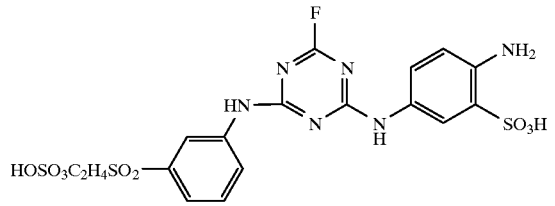 | Orange |
| 5 | 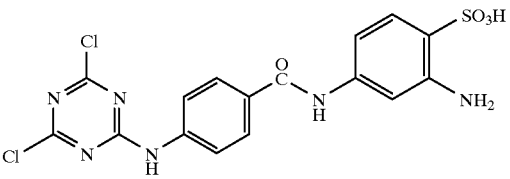 | Orange |
| A | C | D |
|---|---|---|
| 1 | 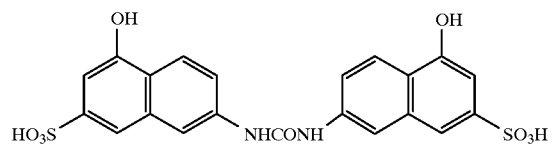 | Red |
| 2 | 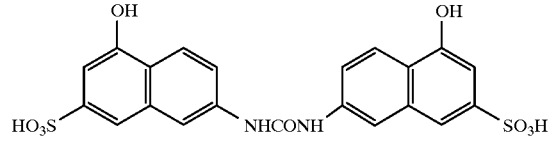 | Orange |
| 3 | 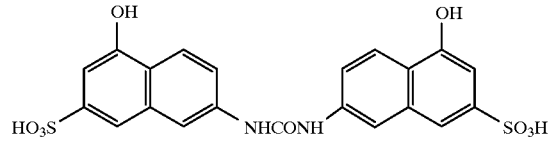 | Red |
| 4 | 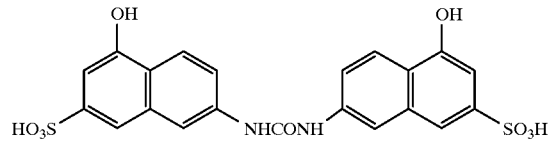 | Orange |
| 5 | 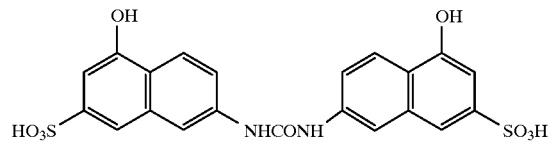 | Orange |

TABLE 2

| A | B | D |
|---|---|---|
| 6 | 4-[N-methyl-N-(5-chloro-2,6-difluoropyrimidin-4-yl)amino]-2-aminobenzenesulfonic acid derivative (pyrimidine with F, Cl, F substituents linked via N(CH₃) to phenyl bearing NH₂ and SO₃H) | Orange |
| 7 | Triazine with three substituents: 3-sulfophenyl-NH–, CH₂=CHSO₂C₂H₄NH–, and –NH–(4-sulfo-3-aminophenyl) | Orange |
| 8 | Triazine with OCH₃, HOSO₃C₂H₄SO₂C₂H₄NH–, and –NH–(4-sulfo-3-aminophenyl) | Red |
| 9 | Triazine with 3-(ClC₂H₄O₂S)phenyl-NH–, HOSO₃C₂H₄SO₂C₃H₆NH–, and –NH–(4-amino-3-sulfophenyl) | Red |
| 10 | Triazine with 4-sulfophenyl-NH–, HOSO₃C₂H₄SO₂C₂H₄NH–, and –NH–(4-sulfo-3-aminophenyl) | Orange |

| A | C | D |
|---|---|---|
| 6 | Bis(naphthol) linked by –NHCONH–: each naphthalene bears OH and SO₃H (HO₃S– on one side, –SO₃H on the other) | Orange |
| 7 | Bis(naphthol) linked by –NHCONH–: each naphthalene bears OH and SO₃H (isomeric arrangement) | Orange |

TABLE 2-continued

| 8 | (structure: two naphthalene units linked by NH; each naphthalene has OH and SO3H/HO3S substituents) | Red |
| 9 | (structure: two naphthalene units linked by NH; each naphthalene has OH and SO3H/HO3S substituents) | Red |
| 10 | (structure: two naphthalene units linked by NHCONH; each naphthalene has OH and SO3H/HO3S substituents) | Orange |

TABLE 3

| A | B | D |
|---|---|---|
| 11 | (triazine with F, HOSO$_3$C$_2$H$_4$SO$_2$C$_2$H$_4$NH, linked via NH to benzene with SO$_3$H and NH$_2$) | Scarlet |
| 12 | (triazine with OCH$_3$ and Cl, linked via NH to benzene-C(O)NH-benzene with SO$_3$H and NH$_2$) | Red |
| 13 | (dichlorotriazine linked via NH to benzene with SO$_3$H and NH$_2$) | Red |
| 14 | (triazine with OH, HOSO$_3$C$_2$H$_4$SO$_2$C$_2$H$_4$NH, linked via NH to benzene with SO$_3$H and NH$_2$) | Scarlet |
| 15 | (triazine with NHCH$_3$, linked via NH to HOSO$_3$C$_2$H$_4$SO$_2$-benzene and via NH to benzene with SO$_3$H and NH$_2$) | Orange |

TABLE 3-continued

| A | C | D |
|---|---|---|
| 11 | 8-hydroxy-6-sulfo-naphth-2-yl-NHCONH-8-hydroxy-6-sulfo-naphth-2-yl | Scarlet |
| 12 | 8-hydroxy-6-sulfo-naphth-2-yl-NH-8-hydroxy-6-sulfo-naphth-2-yl | Red |
| 13 | 8-hydroxy-6-sulfo-naphth-2-yl-NHCONH-8-hydroxy-6-sulfo-naphth-2-yl | Red |
| 14 | 8-hydroxy-6-sulfo-naphth-2-yl-NHCONH-8-hydroxy-6-sulfo-naphth-2-yl | Scarlet |
| 15 | 8-hydroxy-4,6-disulfo-naphth-2-yl-NHCONH-8-hydroxy-4,6-disulfo-naphth-2-yl | Orange |

TABLE 4

| A | B | D |
|---|---|---|
| 16 | $HOSO_3C_2H_4SO_2C_3H_6O$—[2-amino-phenyl-3-$SO_3H$] | Red |
| 17 | $HOSO_3C_2H_4SO_2C_6H_{12}O$—[2-amino-phenyl-3-$SO_3H$] | Scarlet |
| 18 | $HOSO_3C_2H_4SO_2C_2H_4NHCOCH_2O$—[2-amino-phenyl-3-$SO_3H$] | Scarlet |

TABLE 4-continued

| | | |
|---|---|---|
| 19 | [structure: 4-amino-3-sulfo-phenyl with CH$_2$=CHSO$_2$C$_3$H$_6$O- substituent] | Scarlet |
| 20 | [structure: 4-amino-3-sulfo-phenyl with HOSO$_3$C$_2$H$_4$SO$_2$C$_2$H$_4$OC$_2$H$_4$O- substituent] | Scarlet |

| A | C | D |
|---|---|---|
| 16 | [bis-naphthol structure linked by NH, with HO$_3$S, HO$_3$S, SO$_3$H, SO$_3$H groups and OH groups] | Red |
| 17 | [bis-naphthol structure linked by NHCONH, with HO$_3$S and SO$_3$H and OH groups] | Scarlet |
| 18 | [bis-naphthol structure linked by NHCONH, with HO$_3$S and SO$_3$H and OH groups] | Scarlet |
| 19 | [bis-naphthol structure linked by NHCONH, with HO$_3$S and SO$_3$H and OH groups] | Scarlet |
| 20 | [bis-naphthol structure linked by NHCONH, with HO$_3$S and SO$_3$H and OH groups] | Scarlet |

Example 3

In an aqueous medium, 41.9 parts of a compound of which free acid is represented by the formula (14)

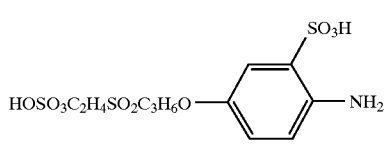

(14)

is diazotized by an ordinary method using sodium nitrite to obtain a diazo compound. Then, 50.5 parts of a compound of which free acid is represented by the general formula (13) is coupled with the above-described diazo compound by an ordinary method, then, salted out to obtain a corresponding monoazo compound. Separately, in an aqueous medium, 28.1 parts of 4-(β-sulfatoethylsulfonyl)aniline-2-sulfonic acid is diazotized according to an ordinary method using sodium nitrite. Then, the diazotized compound is coupled with the above monoazo compound to obtain a bisazo compound of which free acid is represented by the following formula.

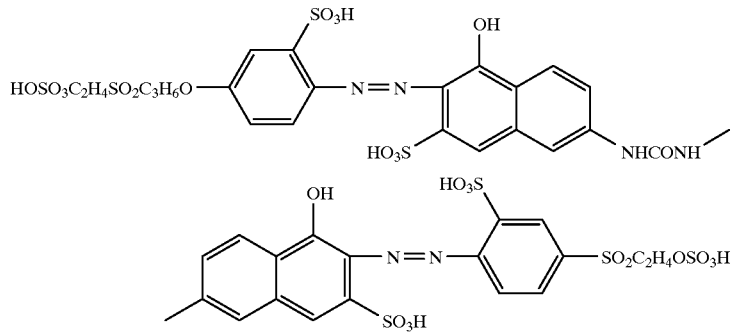

(λ max=502 nm, in an aqueous medium)

Example 4

The same synthesis procedure as that in Examples 3 is repeated, except that the compound (14), 4-(β-sulfatoethylsulfonyl)aniline and the compound (13) are replaced with a compound listed in column B, a compound listed in column C and a compound listed in column D, respectively, in the following Tables 5 to 15 to obtain a corresponding bisazo compounds of the present invention.

It is expected that color tone shown in column E in the Tables 5 to 15 is revealed on cotton.

TABLE 5

| A | B | E |
|---|---|---|
| 1 | [structure] | Red |
| 2 | [structure] | Red |
| 3 | [structure] | Red |
| 4 | [structure] | Red |

TABLE 5-continued
| | | E |
|---|---|---|
| 5 | 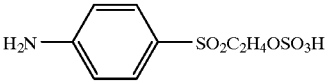 | Red |
| A | C | E |
|---|---|---|
| 1 | 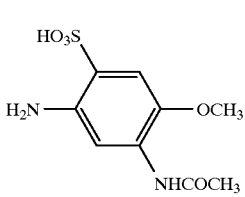 H₂N—⟨ ⟩—SO₂C₂H₄OSO₃H | Red |
| 2 | 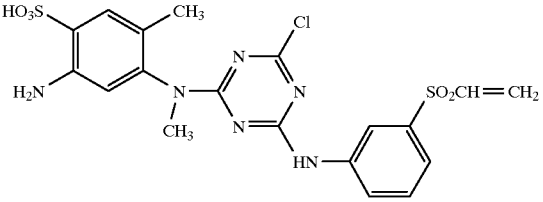 | Red |
| 3 | 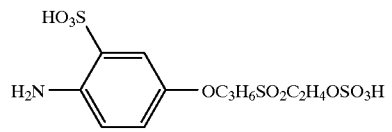 | Red |
| 4 | 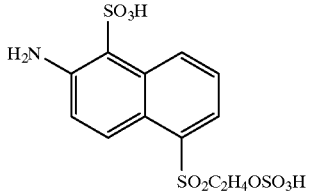 | Red |
| 5 | 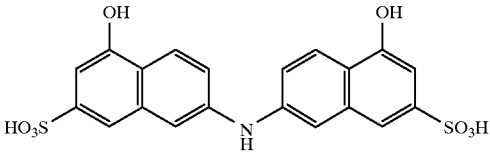 | Red |
| A | D | E |
|---|---|---|
| 1 | 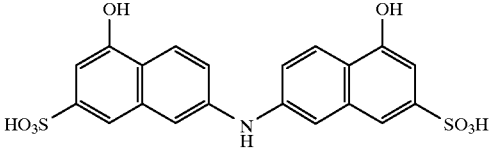 | Red |
| 2 | | Red |

TABLE 5-continued

| | | |
|---|---|---|
| 3 | [structure: 5-hydroxy-naphthalene-2-sulfonic acid linked via NH at 7-position to 7-position of another 5-hydroxy-naphthalene-2-sulfonic acid] | Red |
| 4 | [structure: similar bis-naphthalene linked via NH, with OH and SO₃H substituents] | Red |
| 5 | [structure: similar bis-naphthalene linked via NH, with OH and SO₃H substituents] | Red |

TABLE 6

| A | B | E |
|---|---|---|
| 6 | [triazine structure with phenyl-NH, (3-HOSO₃C₂H₄SO₂-phenyl)-NH, and (4-SO₃H-3-NH₂-phenyl)-NH substituents] | Red |
| 7 | [triazine with Cl, HOSO₃C₂H₄SO₂C₂H₄NH, and (3-SO₃H-4-NH₂-phenyl)-NH substituents] | Scarlet |
| 8 | [triazine with Cl, (3-ClC₂H₄SO₂-phenyl)-NH, and (2-CH₃O-4-SO₃H-5-NH₂-phenyl)-NH substituents] | Scarlet |

TABLE 6-continued
| | | |
|---|---|---|
| 9 | 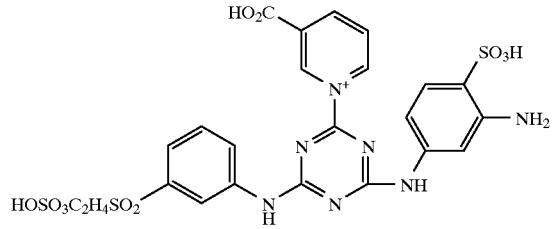 | Scarlet |
| 10 | 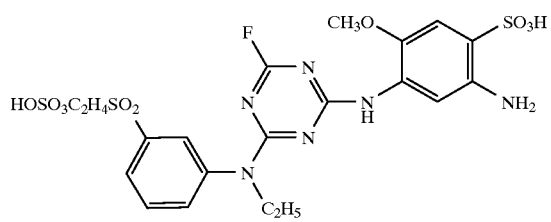 | Scarlet |
| A | C | E |
| 6 | 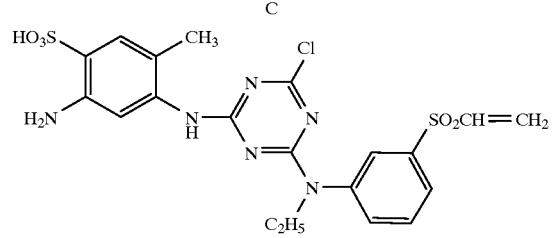 | Red |
| 7 | 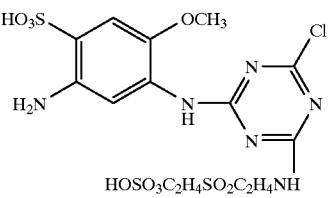 | Scarlet |
| 8 | 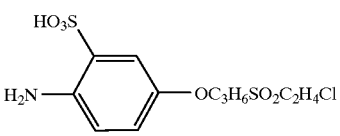 | Scarlet |
| 9 | 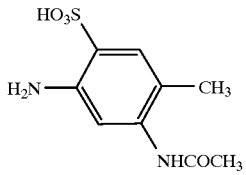 | Scarlet |
| 10 | 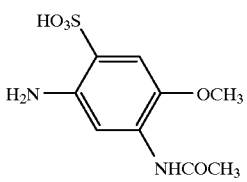 | Scarlet |

TABLE 6-continued
| A | D | E |
|---|---|---|
| 6 | 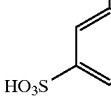 | Red |
| 7 | 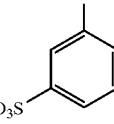 | Scarlet |
| 8 | 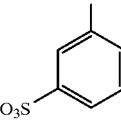 | Scarlet |
| 9 | 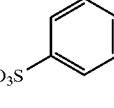 | Scarlet |
| 10 | 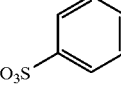 | Scarlet |
TABLE 7
| A | B | E |
|---|---|---|
| 11 | 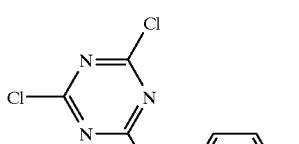 | Scarlet |
| 12 | 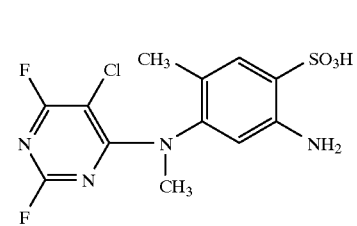 | Red |

TABLE 7-continued

| | A | C | E |
|---|---|---|---|
| 13 | | pyrimidine(2,6-F)-NH-C6H4-CONH-C6H3(SO3H)(NH2) | Red |
| 14 | | pyrimidine(2,5-Cl,6-F)... | Scarlet |
| 15 | | pyrimidine(2,5,6-Cl)... | Scarlet |
| 11 | | 5-amino-2-methyl-4-(NHCOPh)-benzenesulfonic acid | Scarlet |
| 12 | | triazine derivative | Red |
| 13 | | chloro-difluoropyrimidine derivative | Red |
| 14 | | 5-amino-2-methyl-4-(N(COCH3)CH3)-benzenesulfonic acid | Scarlet |

TABLE 7-continued

| | | |
|---|---|---|
| 15 | structure with HO$_3$S, OCH$_3$, H$_2$N, NH, OCH$_3$, triazine, NHC$_2$H$_4$SO$_2$C$_2$H$_4$OSO$_3$H | Scarlet |

| A | D | E |
|---|---|---|
| 11 | bis-naphthalene structure: OH, HO$_3$S — NHCONH — OH, SO$_3$H | Scarlet |
| 12 | bis-naphthalene structure: OH, HO$_3$S — NH — OH, SO$_3$H | Red |
| 13 | bis-naphthalene structure: OH, HO$_3$S — NH — OH, SO$_3$H | Red |
| 14 | bis-naphthalene structure: OH, HO$_3$S — NHCONH — OH, SO$_3$H | Scarlet |
| 15 | bis-naphthalene structure: OH, HO$_3$S — NHCONH — OH, SO$_3$H | Scarlet |

TABLE 8

| A | B | E |
|---|---|---|
| 16 | triazine structure with HO$_3$S-phenyl-NH, SO$_3$H/NH$_2$-phenyl-NH, HOSO$_3$C$_2$H$_4$SO$_2$-phenyl-NH substituents | Scarlet |

TABLE 8-continued
| | | |
|---|---|---|
| 17 | 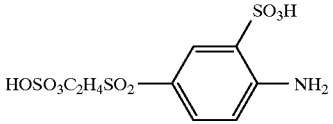 | Red |
| 18 | 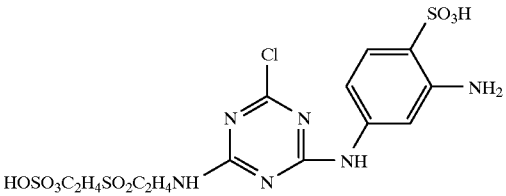 | Orange |
| 19 | 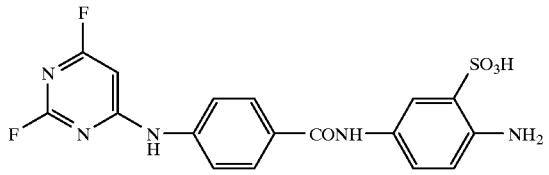 | Red |
| 20 | 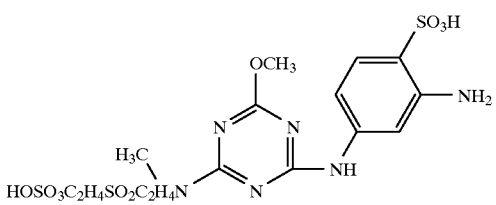 | Scarlet |
| A | C | E |
|---|---|---|
| 16 | 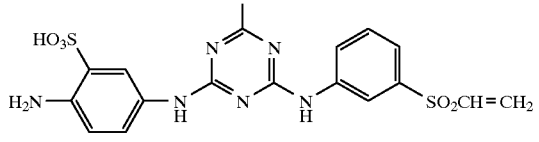 | Scarlet |
| 17 | 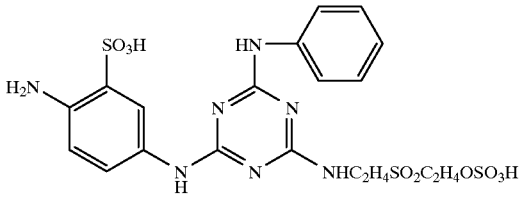 | Red |
| 18 | 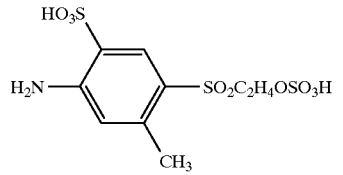 | Orange |
| 19 | 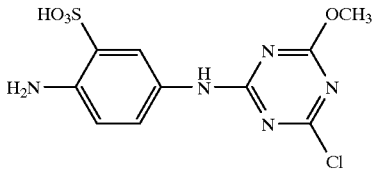 | Red |

TABLE 8-continued

| | | |
|---|---|---|
| 20 | ![structure: 2-amino-naphthalene with SO3H at 1-position and SO2CH=CH2 at 5-position] | Scarlet |

| A | D | E |
|---|---|---|
| 16 | ![bis-naphthol structure with OH, HO3S, NHCONH bridge, SO3H] | Scarlet |
| 17 | ![bis-naphthol structure with OH, HO3S, NHCONH bridge, SO3H] | Red |
| 18 | ![bis-naphthol structure with OH, HO3S, NHCONH bridge, SO3H] | Orange |
| 19 | ![bis-naphthol structure with OH, HO3S, NHCONH bridge, SO3H] | Red |
| 20 | ![bis-naphthol structure with OH, HO3S, NHCONH bridge, SO3H] | Scarlet |

TABLE 9

| A | B | E |
|---|---|---|
| 21 | ![triazine structure with Cl, HOSO3C2H4SO2C2H4NH substituent, and NH linked to aminobenzenesulfonic acid (SO3H, NH2)] | Orange |

TABLE 9-continued

| # | Structure | Color |
|---|---|---|
| 22 | 3-(HOSO$_3$C$_2$H$_4$SO$_2$)-C$_6$H$_4$-NH-[triazine(NHC$_3$H$_6$SO$_2$C$_2$H$_4$OSO$_3$H)]-NH-C$_6$H$_3$(SO$_3$H)(NH$_2$) | Red |
| 23 | C$_6$H$_5$-NH-[triazine(NHC$_2$H$_4$SO$_2$C$_2$H$_4$OSO$_3$H)]-NH-C$_6$H$_3$(SO$_3$H)(NH$_2$) | Red |
| 24 | 3-(HOSO$_3$C$_2$H$_4$SO$_2$)-C$_6$H$_4$-N(C$_2$H$_5$)-[triazine(NHC$_2$H$_4$SO$_2$C$_2$H$_4$OSO$_3$H)]-NH-C$_6$H$_3$(NH$_2$)(SO$_3$H) | Orange |
| 25 | 3-(HOSO$_3$C$_2$H$_4$SO$_2$)-C$_6$H$_4$-NH-[triazine(NHC$_3$H$_6$SO$_2$C$_2$H$_4$OSO$_3$H)]-NH-C$_6$H$_3$(NH$_2$)(SO$_3$H) | Orange |

| A | C | E |
|---|---|---|
| 21 | 4-HO$_3$S-3-H$_2$N-C$_6$H$_3$-NH-[triazine(morpholino)(NHC$_2$H$_4$SO$_2$C$_2$H$_4$OSO$_3$H)] | Orange |
| 22 | 4-HO$_3$S-2-H$_2$N-5-CH$_3$-C$_6$H$_2$-NH-CO-C$_6$H$_4$-NHCOCH$_3$ | Red |
| 23 | 3-SO$_3$H-4-NH$_2$-C$_6$H$_3$-NH-[triazine(N$^+$-pyridinium-3-COOH)(NHC$_2$H$_4$SO$_2$C$_2$H$_4$Cl)] | Red |
| 24 | pget,0072 | Orange |

TABLE 9-continued

| | | | |
|---|---|---|---|
| 25 | \[structure: 4-sulfo-2-amino-phenyl-NH-triazine with N(C2H5)(3-SO2CH=CH2-phenyl) and NHC2H4SO2C2H4OSO3H substituents\] | | Orange |

| A | D | | E |
|---|---|---|---|
| 21 | \[5-hydroxy-7-sulfo-naphthyl-2-NHCONH-\] | \[-naphthyl-2 with 5-OH, 7-SO3H\] | Orange |
| 22 | \[5-hydroxy-7-sulfo-naphthyl-2-NHCONH-\] | \[-naphthyl-2 with 5-OH, 7-SO3H\] | Red |
| 23 | \[5-hydroxy-7-sulfo-naphthyl-2-NHCONH-\] | \[-naphthyl-2 with 5-OH, 7-SO3H\] | Red |
| 24 | \[5-hydroxy-7-sulfo-naphthyl-2-NHCONH-\] | \[-naphthyl-2 with 5-OH, 7-SO3H\] | Orange |
| 45 | \[5-hydroxy-7-sulfo-naphthyl-2-NHCONH-\] | \[-naphthyl-2 with 5-OH, 7-SO3H\] | Orange |

TABLE 10

| A | B | E |
|---|---|---|
| 26 | \[structure: F-triazine with NH-(2-amino-4-sulfo-phenyl) and NH-C2H4SO2C2H4OSO3H\] | Scarlet |

TABLE 10-continued
| | A | C | E |
|---|---|---|---|
| 27 | | 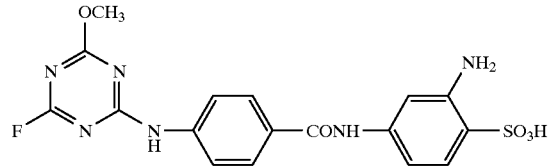 | Scarlet |
| 28 | | 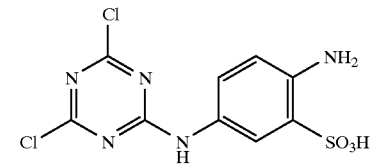 | Scarlet |
| 29 | | 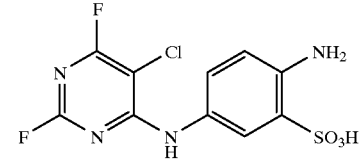 | Scarlet |
| 30 | | 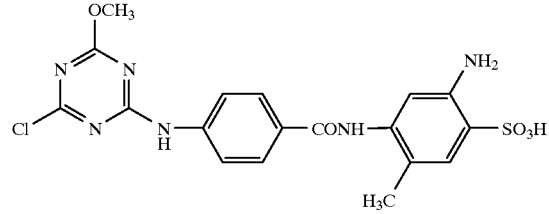 | Red |
| | A | C | E |
|---|---|---|---|
| 26 | | 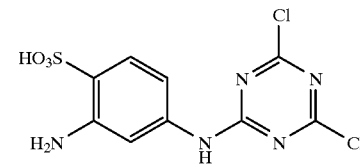 | Scarlet |
| 27 | | 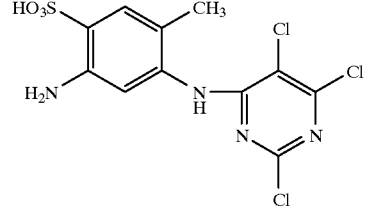 | Scarlet |
| 28 | | 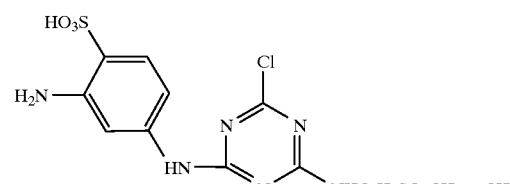 | Scarlet |

TABLE 10-continued
| | | |
|---|---|---|
| 29 | 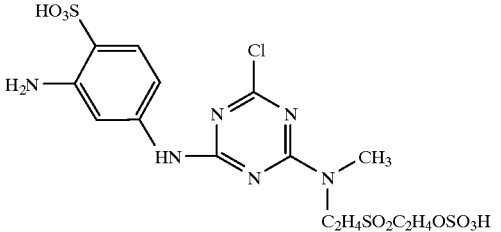 | Scarlet |
| 30 | 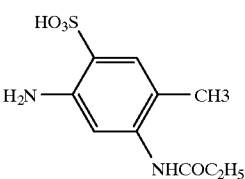 | Red |
| A | D | E |
|---|---|---|
| 26 | 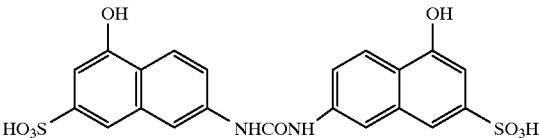 | Scarlet |
| 27 | 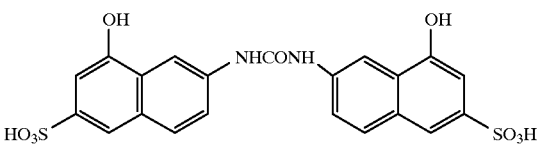 | Scarlet |
| 28 | 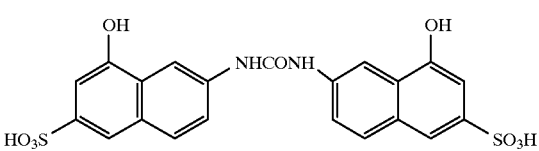 | Scarlet |
| 29 | 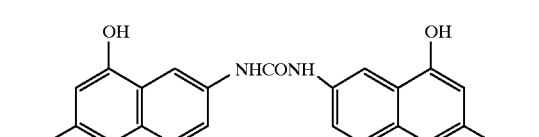 | Scarlet |
| 30 | 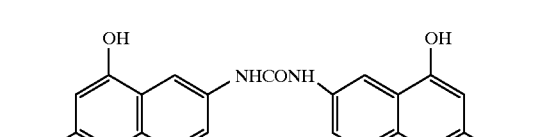 | Red |

TABLE 11

| A | B | E |
|---|---|---|
| 31 | (structure: triazine with Cl, linked via NH to phenyl-CH=CHSO₂ and NH to phenyl-SO₃H/NH₂) | Red |
| 32 | (structure: 2,6-difluoro-5-cyanopyrimidine-NH-phenyl-CONH-phenyl(SO₃H)(NH₂)) | Red |
| 33 | (structure: triazine with Cl, linked to 2,5-disulfo-anilino and to amino-sulfo-phenyl-NH) | Scarlet |
| 34 | (structure: triazine linked to two HOSO₃C₂H₄SO₂-phenyl-NH groups and to amino-sulfo-phenyl-NH) | Orange |
| 35 | (structure: triazine with Cl, N(phenyl)(C₂H₄SO₂C₂H₄SO₃H) and NH-phenyl(NH₂)(SO₃H)) | Orange |

| A | C | E |
|---|---|---|
| 31 | (structure: benzene with HO₃S, H₂N, CH₃, and N(CH₃)COCH₃) | Red |

TABLE 11-continued
| | | |
|---|---|---|
| 32 | 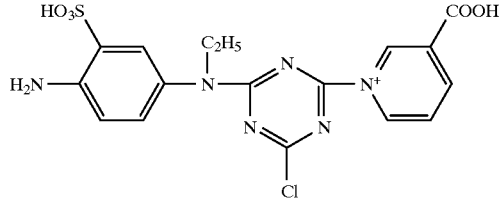 | Red |
| 33 | 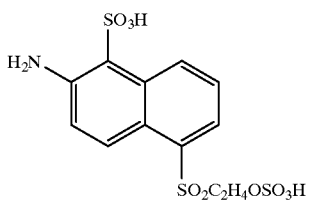 | Scarlet |
| 34 | 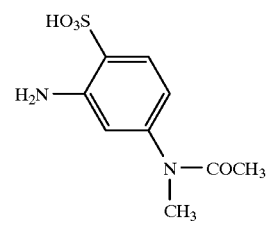 | Orange |
| 35 | 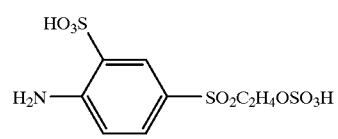 | Orange |
| A | D | E |
|---|---|---|
| 31 | 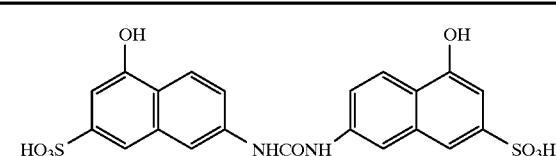 | Red |
| 32 | 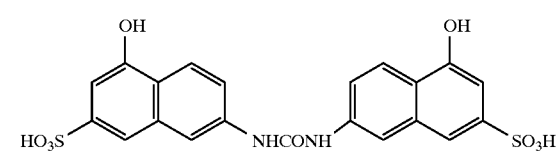 | Red |
| 33 | 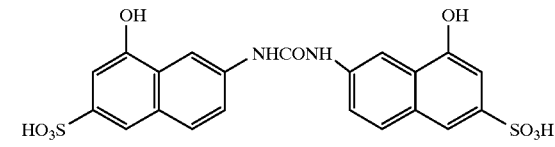 | Scarlet |
| 34 | 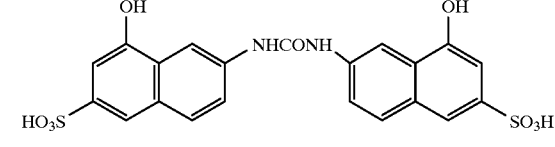 | Orange |

TABLE 11-continued

| 35 | (structure: 4-hydroxy-6-(NHCONH)-naphthalene-2-sulfonic acid dimer, with OH and SO₃H groups) | Orange |

TABLE 12

| A | B | E |
|---|---|---|
| 36 | triazine with HOSO₃C₂H₄SO₂C₂H₄NH— substituent, —OH substituent, and —NH-phenyl(NH₂)(SO₃H) substituent | Orange |
| 37 | triazine with HOSO₃C₂H₄SO₂-phenyl-NH— substituent, —F substituent, and —NH-phenyl(NH₂)(SO₃H) substituent | Scarlet |
| 38 | triazine with HOSO₃C₂H₄SO₂C₃H₆NH— substituent, —Cl substituent, and —NH-phenyl(NH₂)(SO₃H) substituent | Scarlet |
| 39 | 2,6-difluoro-5-cyano-pyrimidine linked via NH-phenyl-CONH to phenyl(NH₂)(SO₃H) | Scarlet |
| 40 | triazine with HOSO₃C₂H₄SO₂-phenyl-NH— substituent, pyridinium (with HO₂C) substituent, and —NH-phenyl(OCH₃)(SO₃H)(NH₂) substituent | Scarlet |

TABLE 12-continued
| A | C | E |
|---|---|---|
| 36 | 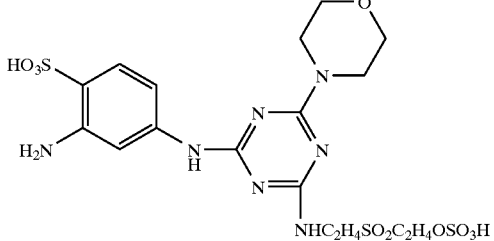 | Orange |
| 37 | 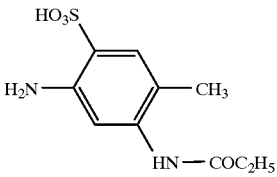 | Scarlet |
| 38 | 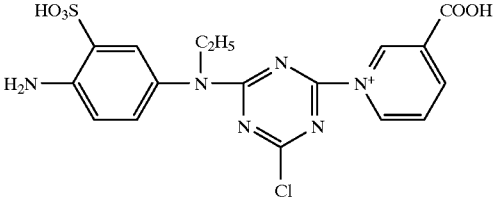 | Scarlet |
| 39 | 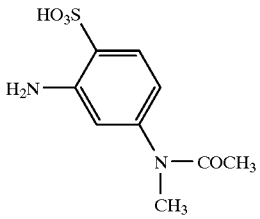 | Scarlet |
| 40 | 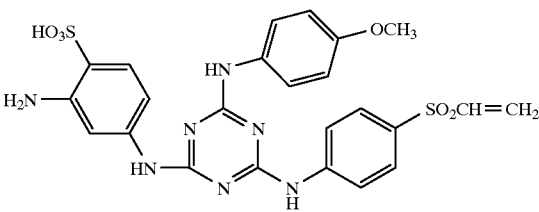 | Scarlet |
| A | D | E |
|---|---|---|
| 36 | 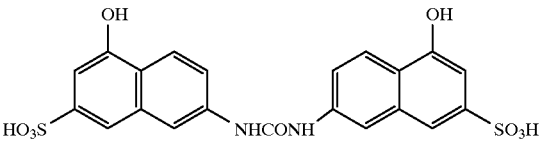 | Orange |
| 37 | 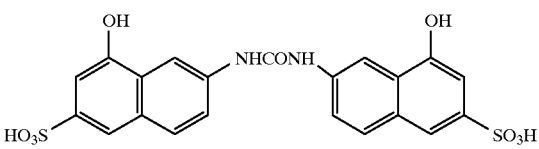 | Scarlet |

TABLE 12-continued

| 38 | [structure: two naphthalene rings linked by NHCONH; left ring bears OH, HO₃S, HO₃S; right ring bears OH, SO₃H, SO₃H] | Scarlet |
| 39 | [structure: two naphthalene rings linked by NHCONH; left ring bears OH, HO₃S, HO₃S; right ring bears OH, SO₃H, SO₃H] | Scarlet |
| 40 | [structure: two naphthalene rings linked by NHCONH; left ring bears OH, HO₃S; right ring bears OH, SO₃H] | Scarlet |

TABLE 13

| A | B | E |
|---|---|---|
| 41 | [structure: triazine with HOSO₃C₂H₄SO₂C₂H₄NH substituent, Cl substituent, and HN-linked aniline with NH₂ and SO₃H] | Scarlet |
| 42 | [structure: triazine with F substituent, HN-linked phenyl bearing HOSO₃C₂H₄SO₂, and HN-linked aniline with NH₂ and SO₃H] | Scarlet |
| 43 | [structure: triazine bearing pyridinium with H₂NOC (nicotinamide), NH-linked phenyl with CH₂=CHSO₂, and NH-linked aniline with SO₃H and NH₂] | Red |

TABLE 13-continued
| | | |
|---|---|---|
| 44 | 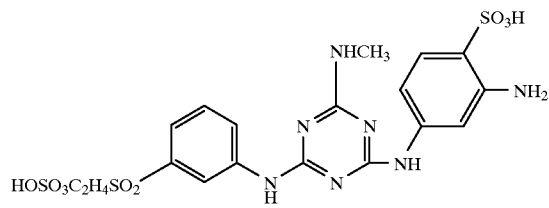 | Scarlet |
| 45 | 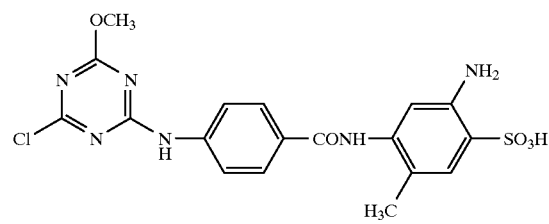 | Red |
| A | C | E |
|---|---|---|
| 41 | 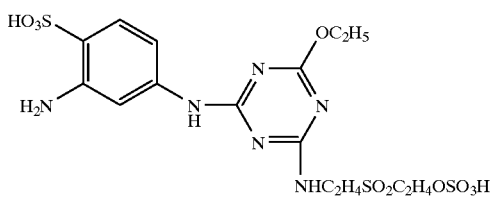 | Scarlet |
| 42 | 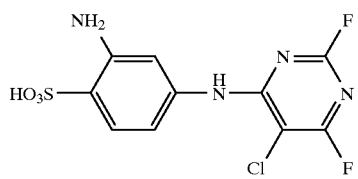 | Scarlet |
| 43 | 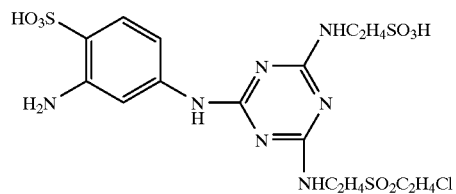 | Red |
| 44 | 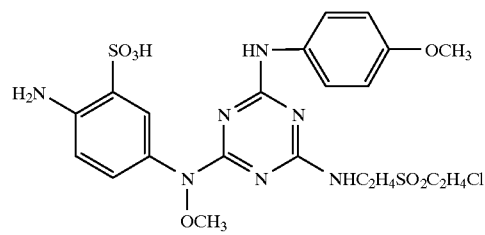 | Scarlet |
| 45 | 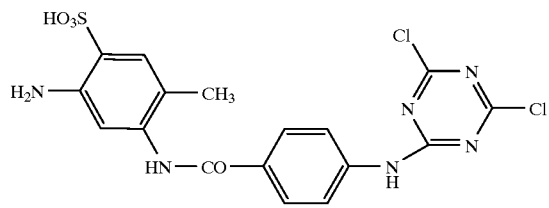 | Red |

TABLE 13-continued

| A | D | E |
|---|---|---|
| 41 | [structure: two naphthalene units linked by NHCONH; left ring has OH, HO₃S, HO₃S; right ring has OH, SO₃H, SO₃H] | Scarlet |
| 42 | [structure: two naphthalene units linked by NHCONH; left ring has OH, HO₃S, HO₃S; right ring has OH, SO₃H, SO₃H] | Scarlet |
| 43 | [structure: two naphthalene units linked by NH; left ring has OH, HO₃S, HO₃S; right ring has OH, SO₃H, SO₃H] | Red |
| 44 | [structure: two naphthalene units linked by NHCONH; left ring has OH, HO₃S; right ring has OH, SO₃H] | Scarlet |
| 45 | [structure: two naphthalene units linked by NHCONH; left ring has OH, HO₃S; right ring has OH, SO₃H] | Red |

TABLE 14

| A | B | E |
|---|---|---|
| 46 | HOSO₃C₂H₄SO₂C₃H₆O—[benzene with SO₃H and NH₂] | Scarlet |
| 47 | HOSO₃C₂H₄SO₂C₃H₆O—[benzene with SO₃H and NH₂] | Red |
| 48 | HOSO₃C₂H₄SO₂C₃H₆O—[benzene with SO₃H and NH₂] | Scarlet |

TABLE 14-continued

| | | |
|---|---|---|
| 49 | HOSO$_3$C$_2$H$_4$SO$_2$C$_2$H$_4$OC$_2$H$_4$O—[phenyl with SO$_3$H, NH$_2$] | Scarlet |
| 50 | HOSO$_3$C$_2$H$_4$SO$_2$C$_2$H$_4$NHCOCH$_2$O—[phenyl with SO$_3$H, NH$_2$] | Red |

| A | C | E |
|---|---|---|
| 46 | [aminophenyl-SO$_3$H linked to triazine (Cl) with NH-phenyl-SO$_2$C$_2$H$_4$OSO$_3$H] | Scarlet |
| 47 | [aminophenyl-SO$_3$H linked to triazine (Cl) with NHC$_2$H$_4$SO$_2$CH=CH$_2$] | Red |
| 48 | [aminophenyl-SO$_3$H linked to triazine (F) with N(C$_2$H$_4$SO$_2$C$_2$H$_4$OSO$_3$H) and N-phenyl] | Scarlet |
| 49 | [aminophenyl-SO$_3$H linked to 5-chloro-2,6-difluoropyrimidine] | Scarlet |
| 50 | [aminophenyl-SO$_3$H with CH$_3$, HN—CO-phenyl-NH linked to 5-chloro-2,6-difluoropyrimidine] | Red |

| A | D | E |
|---|---|---|
| 46 | [bis(1-hydroxy-naphthalene-sulfonic acid) linked by NHCONH] | Scarlet |

TABLE 14-continued

| | | |
|---|---|---|
| 47 | 4-hydroxy-7-[(4-hydroxy-6-sulfo-2-naphthyl)amino]-2-naphthalenesulfonic acid structure with OH, HO₃S, NH, SO₃H groups | Red |
| 48 | bis-naphthyl urea structure: OH, HO₃S, HO₃S, NHCONH, OH, SO₃H, SO₃H | Scarlet |
| 49 | bis-naphthyl urea structure (isomer): OH, HO₃S, HO₃S, NHCONH, OH, SO₃H, SO₃H | Scarlet |
| 50 | 4-hydroxy-7-[(5-hydroxy-7-sulfo-2-naphthyl)amino]-2-naphthalenesulfonic acid structure with OH, HO₃S, NH, SO₃H | Red |

TABLE 15

| A | B | E |
|---|---|---|
| 51 | $CH_2=CHSO_2C_3H_6O$—C₆H₃(SO₃H)(NH₂) | Red |
| 52 | $ClC_2H_4SO_2C_6H_{12}O$—C₆H₃(SO₃H)(NH₂) | Red |
| 53 | $HOSO_3C_2H_4SO_2C_6H_{12}O$—C₆H₃(SO₃H)(NH₂) | Scarlet |
| 54 | $HOSO_3C_2H_4SO_2C_3H_6O$—C₆H₃(SO₃H)(NH₂) | Red |

TABLE 15-continued
| | | |
|---|---|---|
| 55 | CH$_2$=CHSO$_2$C$_6$H$_{12}$O— (phenyl with SO$_3$H and NH$_2$) | Red |
| A | C | E |
|---|---|---|
| 51 | 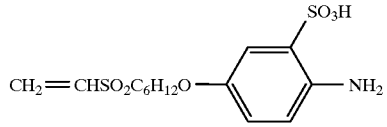 | Red |
| 52 | 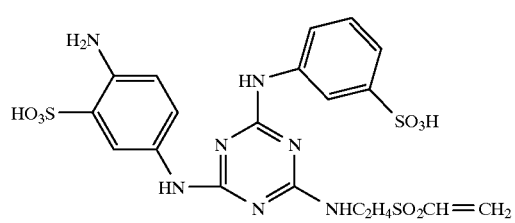 | Red |
| 53 | 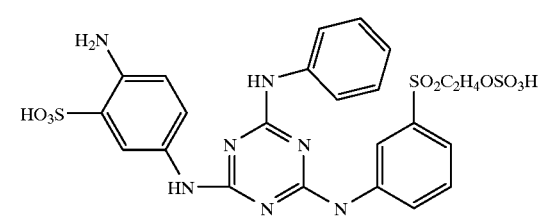 | Scarlet |
| 54 | 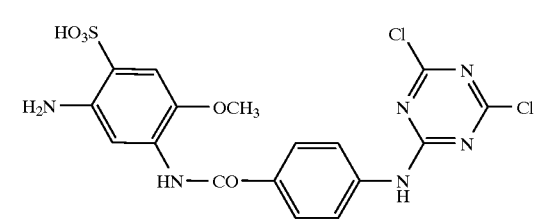 | Red |
| 55 | 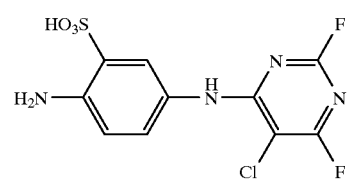 | Red |
| A | D | E |
|---|---|---|
| 51 | 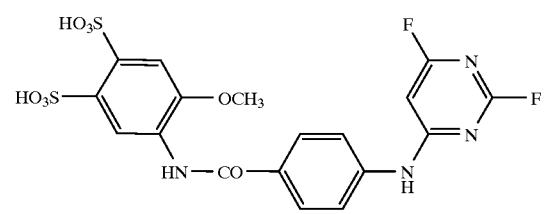 | Red |

TABLE 15-continued

| 52 | (structure: naphthalene-OH with HO3S and HO3S substituents, linked via NH to another naphthalene with OH, SO3H, and SO3H) | Red |
| 53 | (structure: naphthalene-OH with HO3S, linked via NHCONH to naphthalene-OH with SO3H) | Scarlet |
| 54 | (structure: naphthalene-OH with HO3S, linked via NHCONH to naphthalene-OH with SO3H) | Red |
| 55 | (structure: naphthalene-OH with HO3S, linked via NHCONH to naphthalene-OH with SO3H) | Red |

Dyeing Example 1

Each bisazo compounds obtained in Examples 1 and 2 (respectively 0.3 parts) is respectively dissolved in 200 parts of water. To the solution, 20 parts of sodium sulfate is added, and further 10 parts of cotton is added, and the solution is heated to 60° C. Thirty minutes after reaching to 60° C., 4 parts of sodium carbonate is added, and dyeing is conducted at the same temperature for 1 hour. After completion of the dyeing, water-washing and soaping are conducted to obtain a deep colored orange to scarlet or red dyed materials which is excellent in various fastness and has excellent build-up property.

Dyeing Example 2

The same dyeing procedure is conducted as in Dyeing Example 1, except that the amount of sodium salfate is changed from 20 parts to 10 parts to obtain a dyed material having the same qualities as in Dyeing Example 1 for each bisazo compound.

Dyeing Example 3

The same dyeing procedure is conducted as in Dyeing Example 1, except that the amount used of sodium sulfate is changed from 20 parts to 4 parts to obtain a dyed material having the same qualities as in Dyeing Example 1 for each bisazo compound.

Dyeing Example 4

The same dyeing procedure is conducted as in Dyeing Examples 1 to 3, except that the temperature is changed from 60° C. to 70° C. to obtain a dyed material having the same qualities as in Dyeing Example 1 for each bisazo compound.

Dyeing Example 5

The same dyeing procedure is conducted as in Dyeing Examples 1 to 3, except that the temperature is changed from 60° C. to 80° C. to obtain a dyed material having the same qualities as in Dyeing Example 1 for each bisazo compound.

Dyeing Example 6

Color pastes each having the following composition are prepared using each bisazo compound obtained in Examples 1 and 2.

Color paste composition

Bisazo compound 5 parts

Urea 5 parts

Sodium alginate (5%) base paste 50 parts

Boiling water 25 parts

Sodium hydrogen carbonate 2 parts

Balance (water) 13 parts

These color paste are printed on mercerized cotton broad cloth. After intermediate drying, steaming is conducted at 100° C. for 5 minutes. Then, washing with hot water, soaping, washing with hot water and drying are conducted to obtain an orange to scarlet or red printed material excellent in various fastness.

What is claimed is:

1. A bisazo compound represented by the following general formula (1) or a salt thereof:

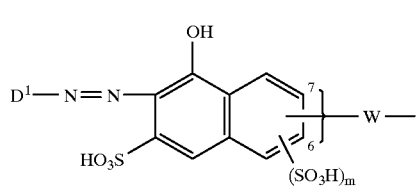

(1)

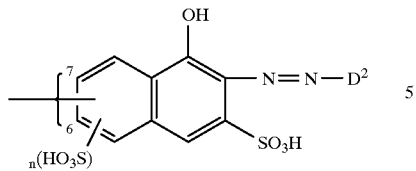

or

X¹ represents a group represented by the general formula (5a):

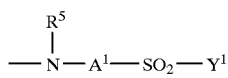  (5a)

while X² represents a group represented by the general formula (5b) or a group represented by the following general formula (5c), (5d) or (5e)

  (5c)

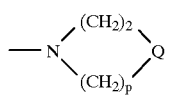  (5d)

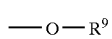  (5e)

in which, $A^1$ and $A^2$, which are same or different, represent alkylene which may be optionally substituted, phenylene which may be optionally substituted or naphthylene which may be optionally substituted, $R^5$, $R^7$, $R^8$ and $R^9$, which are same or different, represent a hydrogen atom, alkyl which may be optionally substituted, cycloalkyl which may optionally substituted or phenyl which may be optionally substituted, $R^6$ represents a hydrogen atom, alkyl having 1–4 carbon atoms which may be optionally substituted by 1 or 2 substituents selected from the group consisting of alkoxy having 1 to 4 carbon wherein m and n, which are the same or different, are 0 or 1; W represents a divalent connecting group represented by —NH— or —NHCONH—, the connecting group connecting two naphthalene rings and the substitution position being at 6-position or 7-position of each respective naphthalene group;

$D^1$ and $D^2$, which are same or different, represent a group represented by the following formula (2a), (2b), (2c) or (2d), provided that at least one of $D^1$ and $D^2$ being a group represented by the formula (2b), (2c) or (2d):

  (2a)

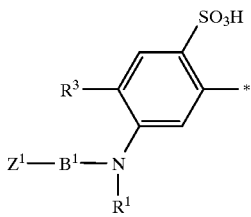  (2b)

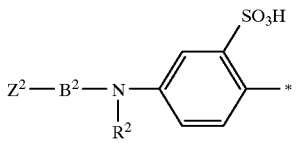  (2c)

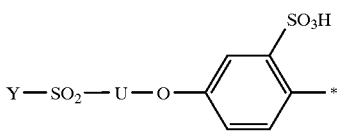  (2d)

in which,

A represents a phenylene group which may be optionally substituted or a naphthylene group which may be optionally substituted;

$R^1$ and $R^2$, which are same or different, represent hydrogen or a lower alkyl group which may be optionally subsituted;

$R^3$ represents hydrogen, methyl or methoxy;

U represents alkylene which may be optionally interrupted by a group of —N(R⁰)—, —NHCO—, —NHCONH—, or —O—, in which $R^0$ represents hydrogen or lower alkyl group;

* indicates a bond to the azo group;

$B^1$ and $B^2$, which are same or different, represent a direct bond or a connecting group represented by the following general formula (3)

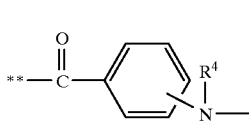  (3)

in which, $R^4$ represents hydrogen or a lower alkyl group which may be optionally substituted, and ** represents a bond to —N(R¹)— or —N(R²)—;

$Z^1$ and $Z^2$, which are same or different and represent an alkylcarbonyl group which may be optionally substituted, phenylcarbonyl group which may be optionally substituted or a group represented by the following general formula (4a);

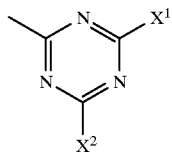
(4a)

in which,
both $X^1$ and $X^2$ represent chloro, or
$X^1$ represents fluoro, chloro or pyridinio:
while $X^2$ represents a group represented by the following general formula (5b);

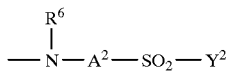
(5b)

atoms, sulfo, carboxy, sulfamoyl, carbamoyl, hydroxy, halogeno, cyano, carbonate, sulfonate, phenyl which may be optionally substituted and sulfate, cycloalkyl which may be optionally substituted or phenyl which may be optionally substituted, Q represents —$CH_2$—, —O—, —S—, —$SO_2$— or —$NR^{10}$, wherein $R^{10}$ represents hydrogen or alkyl which may be optionally substituted, $Y^1$ and $Y^2$, which are same or different, represent a group of —CH=$CH_2$ or —$CH_2CH_2L^1$, wherein $L^1$ represents a group eliminatable by the action of an alkali, and p represents 1, 2 or 3, $X^3$ represents fluoro or chloro, and $X^4$ represents chloro, hydrogen, methyl or cyano;

provided that, when $D^1$ and $D^2$ represent a group represented by the above-described formula (2b) or (2c), $Z^1$ and $Z^2$ represent a group represented by the formula (4a); and Y represents —CH=$CH_2$ or —$CH_2CH_2$L, in which L represents a group eliminatable by the action of an alkali.

2. The bisazo compound or a salt thereof according to claim 1, wherein at least one of $D^1$ and $D^2$ represents a group represented by the formula (2b) or (2c).

3. The bisazo compound or a salt thereof according to claim 1, wherein at least one of $Z^1$ and $Z^2$ represents a group represented by the formula (4a).

4. The bisazo compound or a salt thereof according to claim 1, wherein $B^1$ and $B^2$ represents a direct bond.

5. The bisazo compound or a salt thereof according to claim 1, wherein at least one of $D^1$ and $D^2$ represents a group represented by the formula (2d).

6. The bisazo compound or a salt thereof according to claim 5, wherein U represents alkylene having 3 to 6 carbon atoms which may be optionally interrupted by a group of —O—.

7. The bisazo compound or a salt thereof according to claim 1, wherein W represents a group of —NHCONH—.

8. The bisazo compound or a salt thereof according to claim 1, wherein W represents a group of —NH—.

9. The bisazo compound or a salt thereof according to claim 1, wherein one of $D^1$ and $D^2$ represents a group represented by the formula (2b), (2c) or (2d), and the other represents a group represented by the formula (2a).

10. The bisazo compound or a salt thereof according to claim 9, wherein A is phenylene which may be optionally substituted.

11. The bisazo compound or a salt thereof according to claim 3, wherein $X^1$ represents a fluoro, chloro or pyridinio group which may be optionally substituted, and $X^2$ represents a group represented by the formula (5b).

12. The bisazo compound or a salt thereof according to claim 3, wherein $X^1$ represents a group represented by the formula (5a), and $X^2$ represents a group represented by the formula (5b) or (5c).

13. The bisazo compound or a salt thereof according to claim 12, wherein $A^1$ and $A^2$ each independently represent ethylene, trimethylene or phenylene which may be optionally substituted.

14. A method for dyeing or printing a fiber material which comprises applying the compound or a salt thereof according to claim 1 to the fiber material.

* * * * *